1092699B2

United States Patent
Goto et al.

(10) Patent No.: US 11,092,699 B2
(45) Date of Patent: Aug. 17, 2021

(54) SCINTILLATOR PANEL, AND RADIATION DETECTOR

(71) Applicant: HAMAMATSU PHOTONICS K.K., Hamamatsu (JP)

(72) Inventors: Keisuke Goto, Hamamatsu (JP); Kazuhiro Shirakawa, Hamamatsu (JP); Hidenori Jonishi, Hamamatsu (JP); Masashi Hatanaka, Hamamatsu (JP); Haruki Yamaji, Hamamatsu (JP); Jun Sakurai, Hamamatsu (JP); Yutaka Kusuyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/650,679

(22) PCT Filed: Jul. 3, 2018

(86) PCT No.: PCT/JP2018/025229
§ 371 (c)(1),
(2) Date: Mar. 25, 2020

(87) PCT Pub. No.: WO2019/064785
PCT Pub. Date: Apr. 4, 2019

(65) Prior Publication Data
US 2020/0264322 A1 Aug. 20, 2020

(30) Foreign Application Priority Data
Sep. 27, 2017 (JP) .............................. JP2017-186565

(51) Int. Cl.
*G01T 1/20* (2006.01)
*G01T 1/202* (2006.01)
*G21K 4/00* (2006.01)

(52) U.S. Cl.
CPC .............. *G01T 1/2023* (2013.01); *G21K 4/00* (2013.01)

(58) Field of Classification Search
CPC ......... G01T 1/2006; G01T 1/20; G01T 1/202; G21K 4/00
See application file for complete search history.

(56) References Cited

U.S. PATENT DOCUMENTS 6,608,312 B1 * 8/2003 Okada ....................... G01T 1/20
250/370.11
9,158,009 B2 * 10/2015 Yoshida ............. C09K 11/7733
(Continued)

FOREIGN PATENT DOCUMENTS

CN 103543461 A 1/2014
JP 2007-232636 A 9/2007
(Continued)

OTHER PUBLICATIONS

Yang et al., "Effect of humidity on scintillation performance in Na and Tl activated CsI crystals," 2014, IEEE Transactions on Nuclear Science, vol. 61, No. 2, pp. 1024-1031. (Year: 2014).*
(Continued)

*Primary Examiner* — Kiho Kim
(74) *Attorney, Agent, or Firm* — Faegre Drinker Biddle & Reath LLP

(57) ABSTRACT

A scintillator panel includes a substrate made of an organic material, a barrier layer formed on the substrate and including thallium iodide as a main component, and a scintillator layer formed on the barrier layer and including cesium iodide as a main component. According to this scintillator panel, moisture resistance can be improved by providing the barrier layer between the substrate and the scintillator layer.

5 Claims, 13 Drawing Sheets

(56) References Cited

U.S. PATENT DOCUMENTS

| | | | |
|---|---|---|---|
| 2003/0001101 A1* | 1/2003 | Homme | G01T 1/202 250/370.11 |
| 2008/0179543 A1* | 7/2008 | Nakamura | G21K 4/00 250/484.4 |
| 2008/0308736 A1* | 12/2008 | Suzuki | G01T 1/20 250/370.08 |
| 2009/0065705 A1* | 3/2009 | Fuchs | G21K 4/00 250/370.11 |
| 2013/0068953 A1 | 3/2013 | Itaya et al. | |
| 2013/0187054 A1 | 7/2013 | Ishii et al. | |
| 2014/0145086 A1* | 5/2014 | Ishii | G01T 1/202 250/366 |
| 2014/0361182 A1 | 12/2014 | Hasegawa et al. | |
| 2015/0362602 A1 | 12/2015 | Yoshida | |
| 2018/0026145 A1* | 1/2018 | Kamakura | G01J 1/44 257/432 |

FOREIGN PATENT DOCUMENTS

| | | |
|---|---|---|
| JP | 2008-051793 A | 3/2008 |
| JP | 2012-098110 A | 5/2012 |
| JP | 5152179 B2 | 2/2013 |
| WO | WO-2008/117821 A1 | 10/2008 |
| WO | WO-2011/065302 A1 | 6/2011 |

OTHER PUBLICATIONS

Internatinoal Preliminary Report on Patentability dated Apr. 9, 2020 for PCT/JP2018/025229.

* cited by examiner

Fig.3
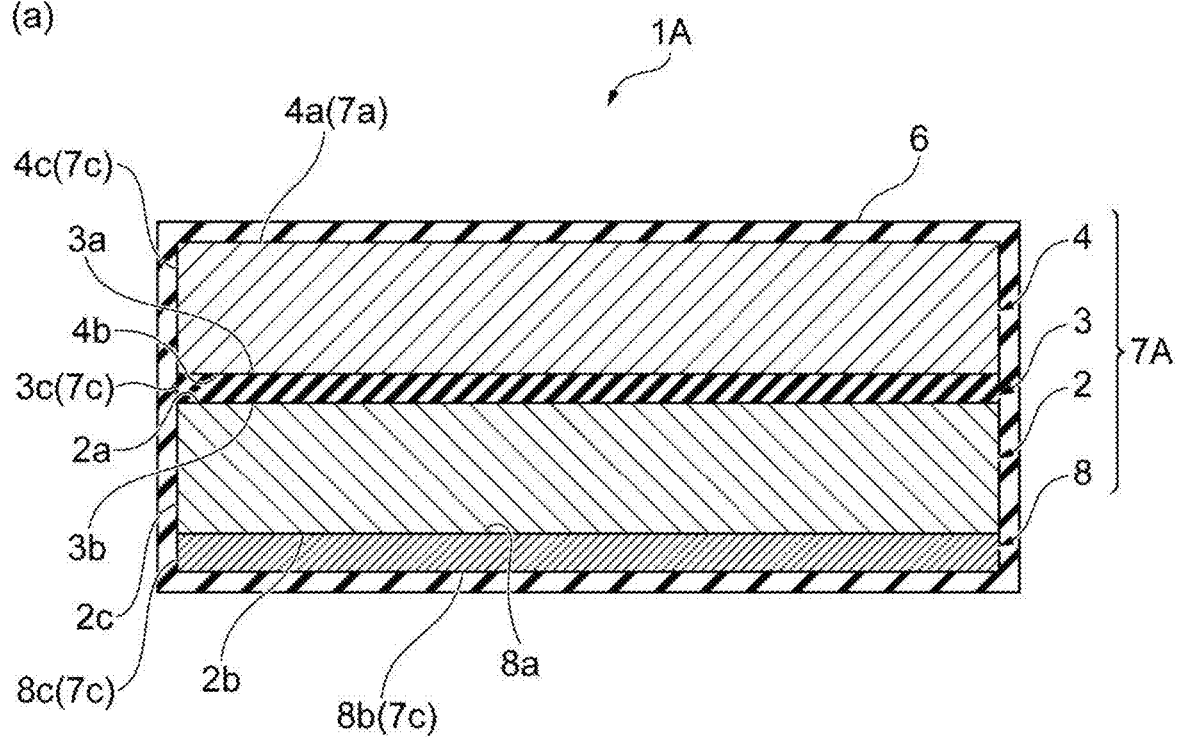
(a)
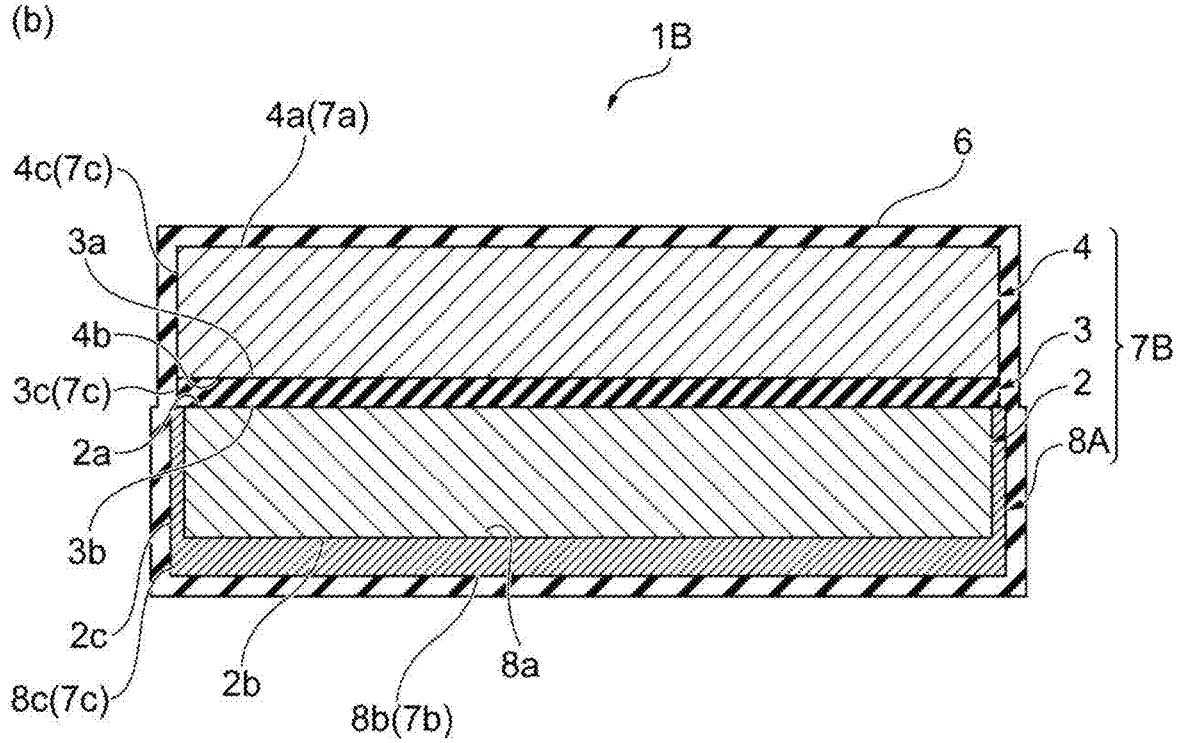
(b)

Fig.4
(a)
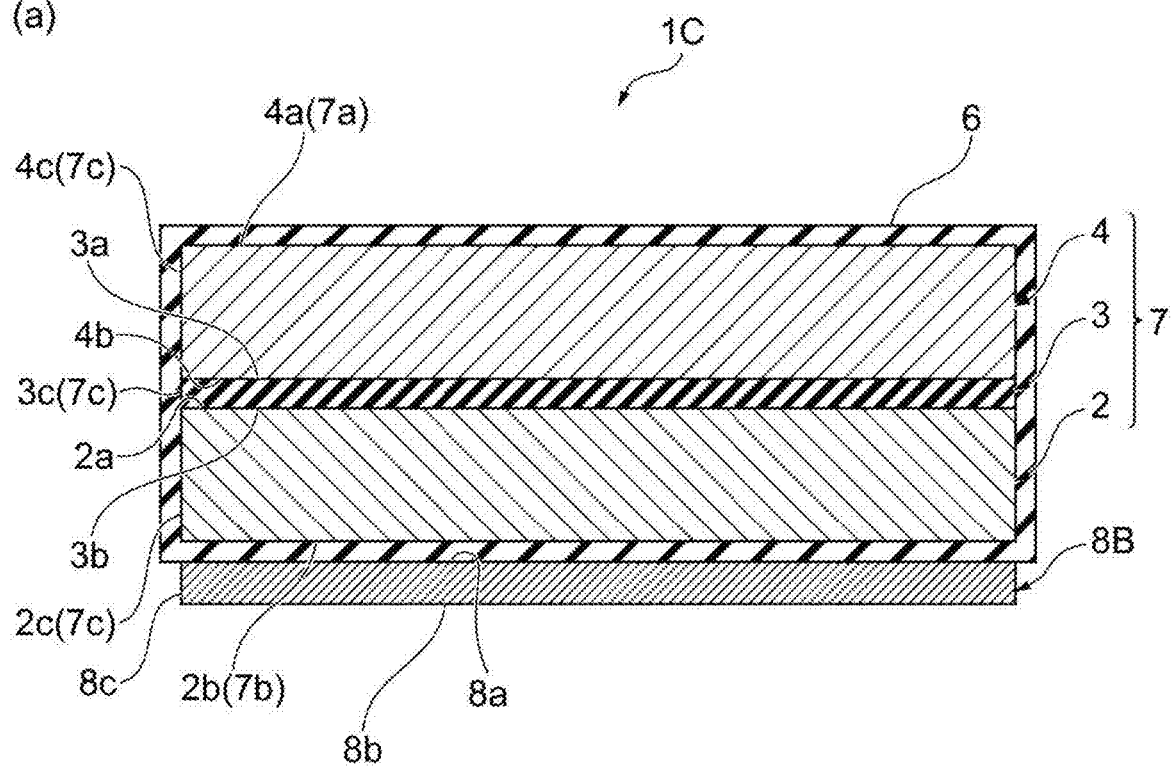
(b)
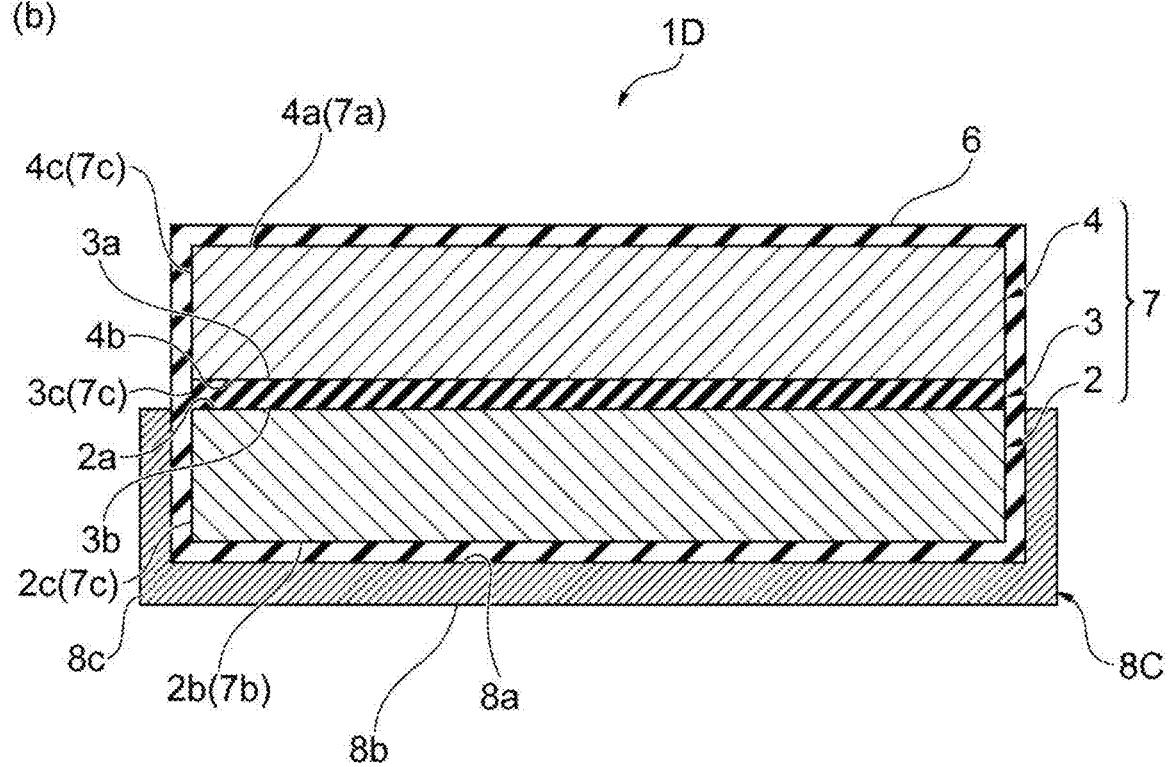

*Fig.6*
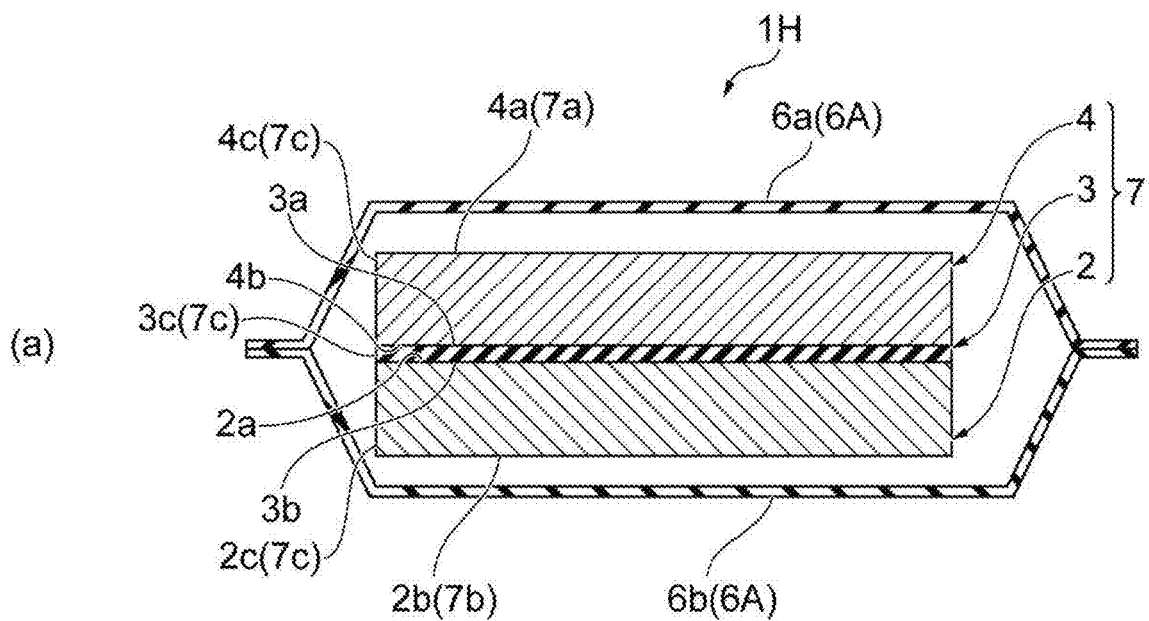
(a)
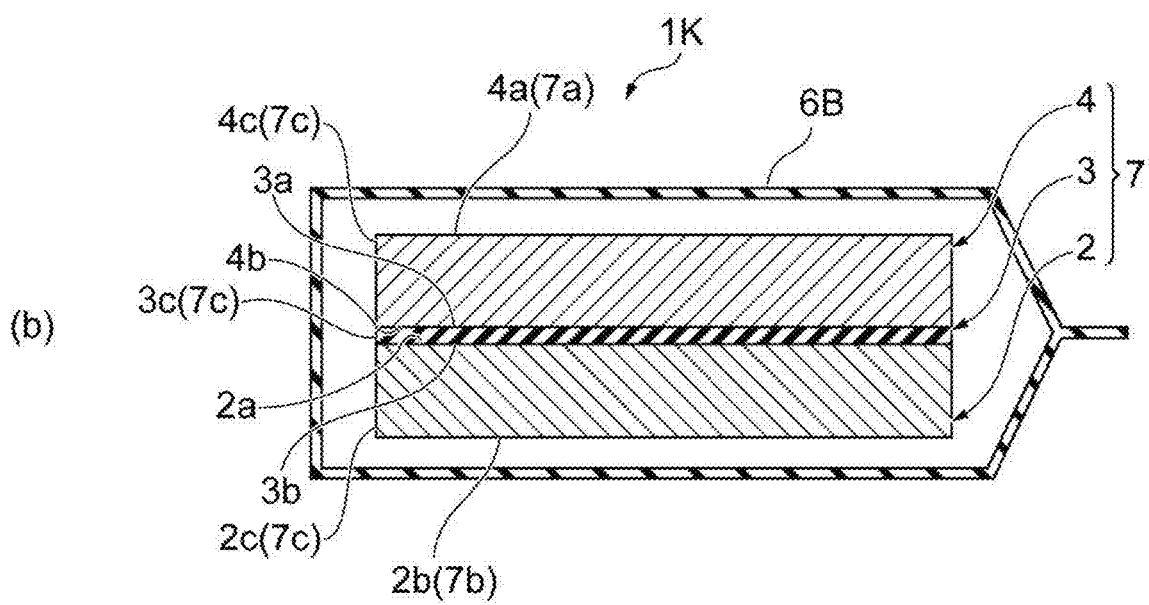
(b)

*Fig.7*
(a)
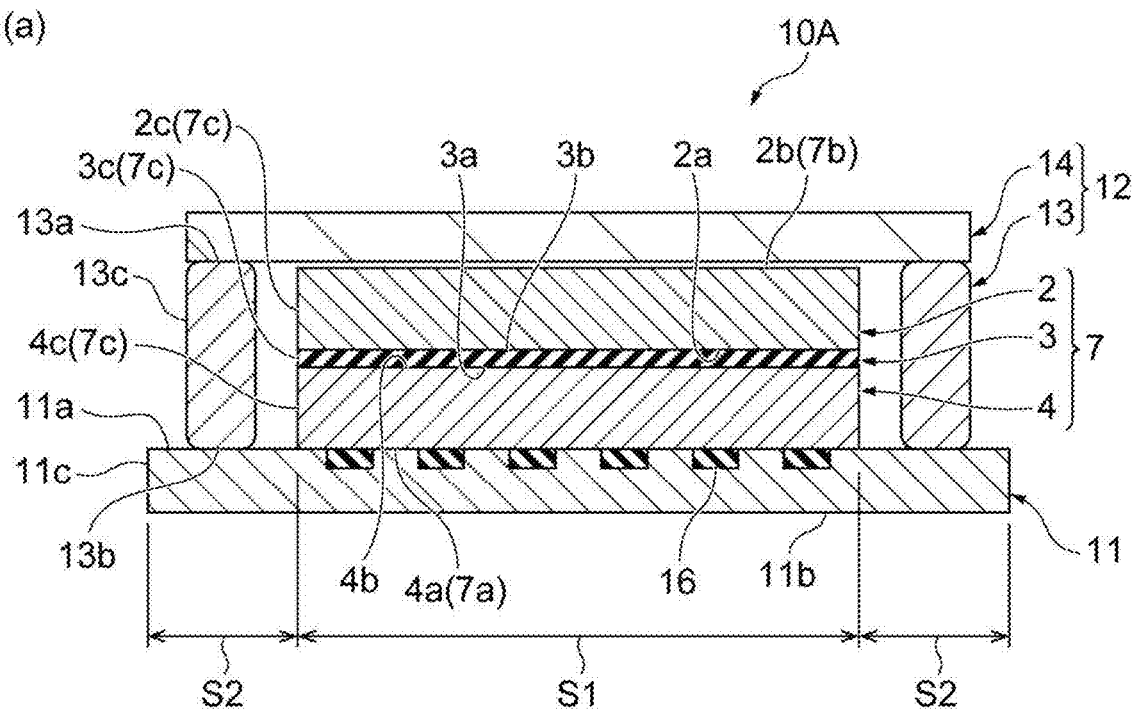
(b)
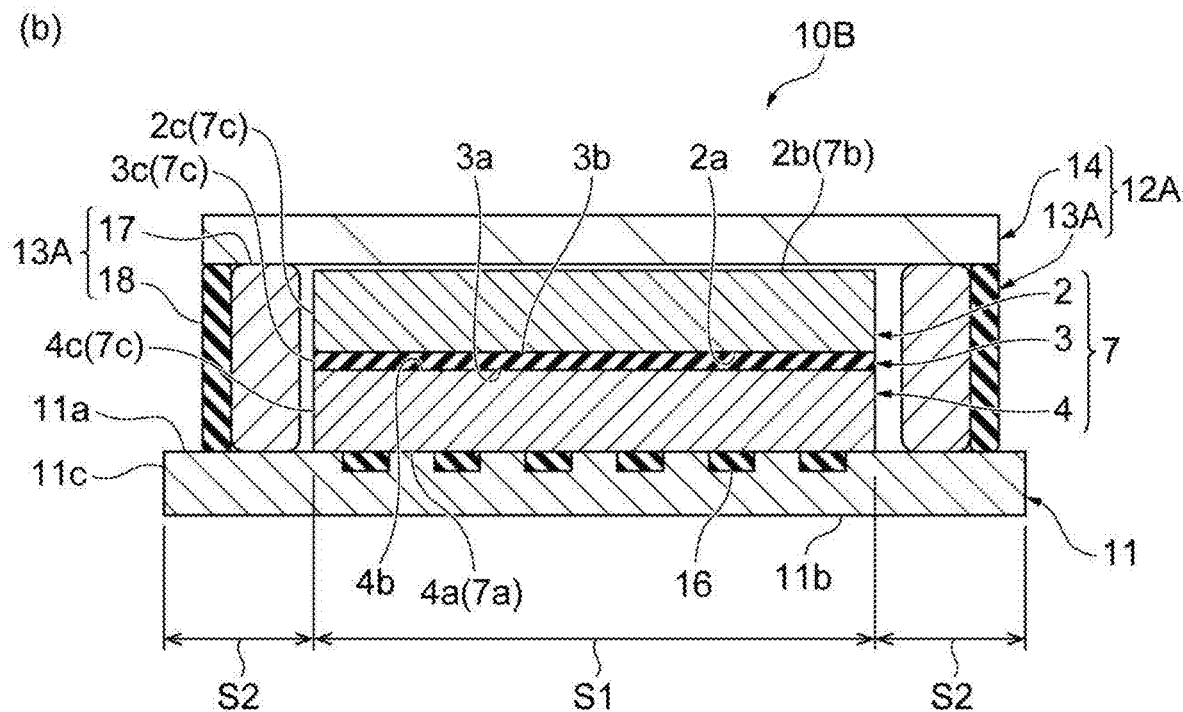

Fig.8
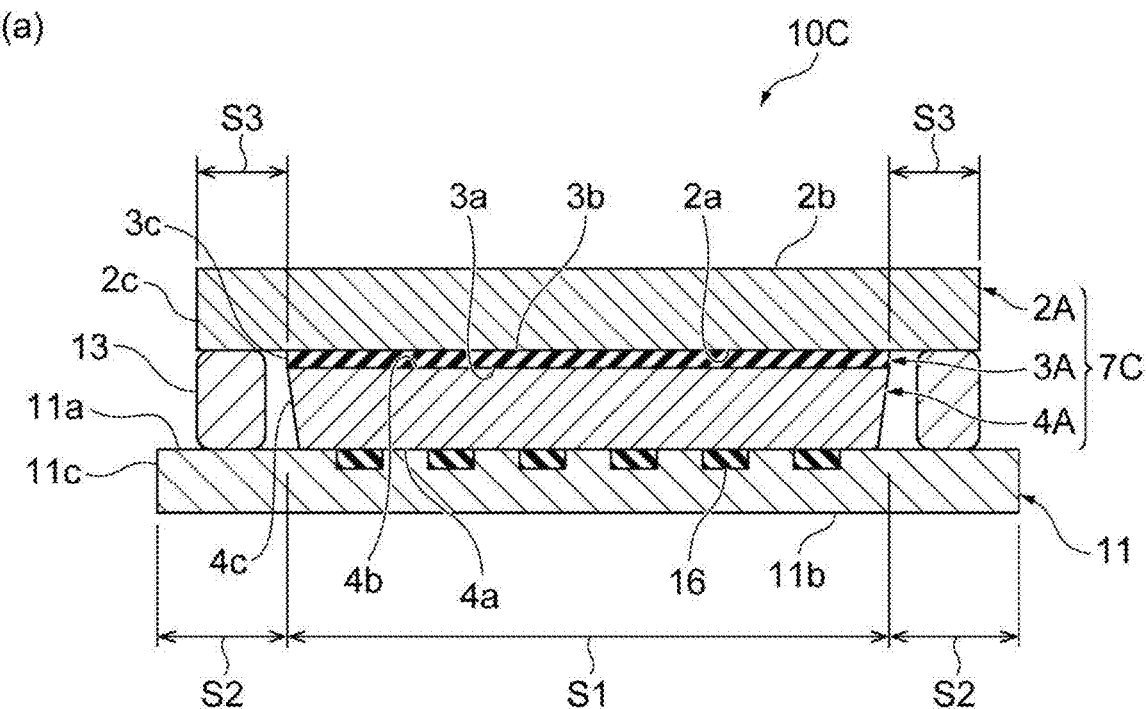
(a)
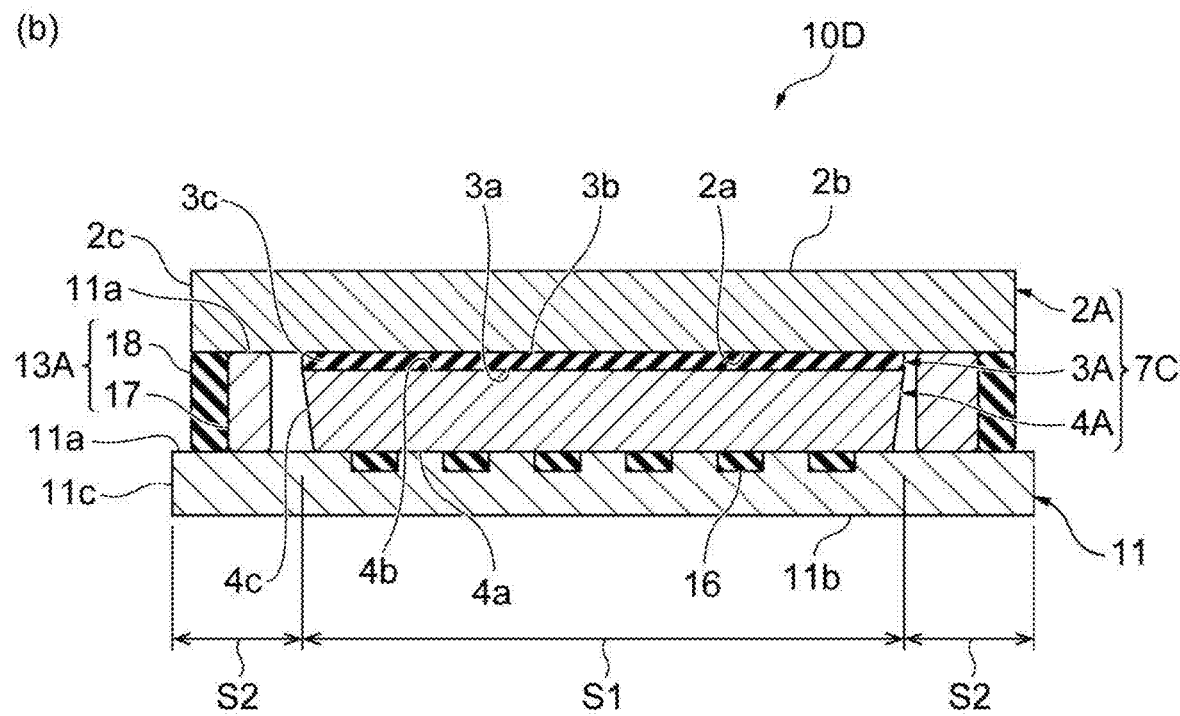
(b)

Fig.9
(a)
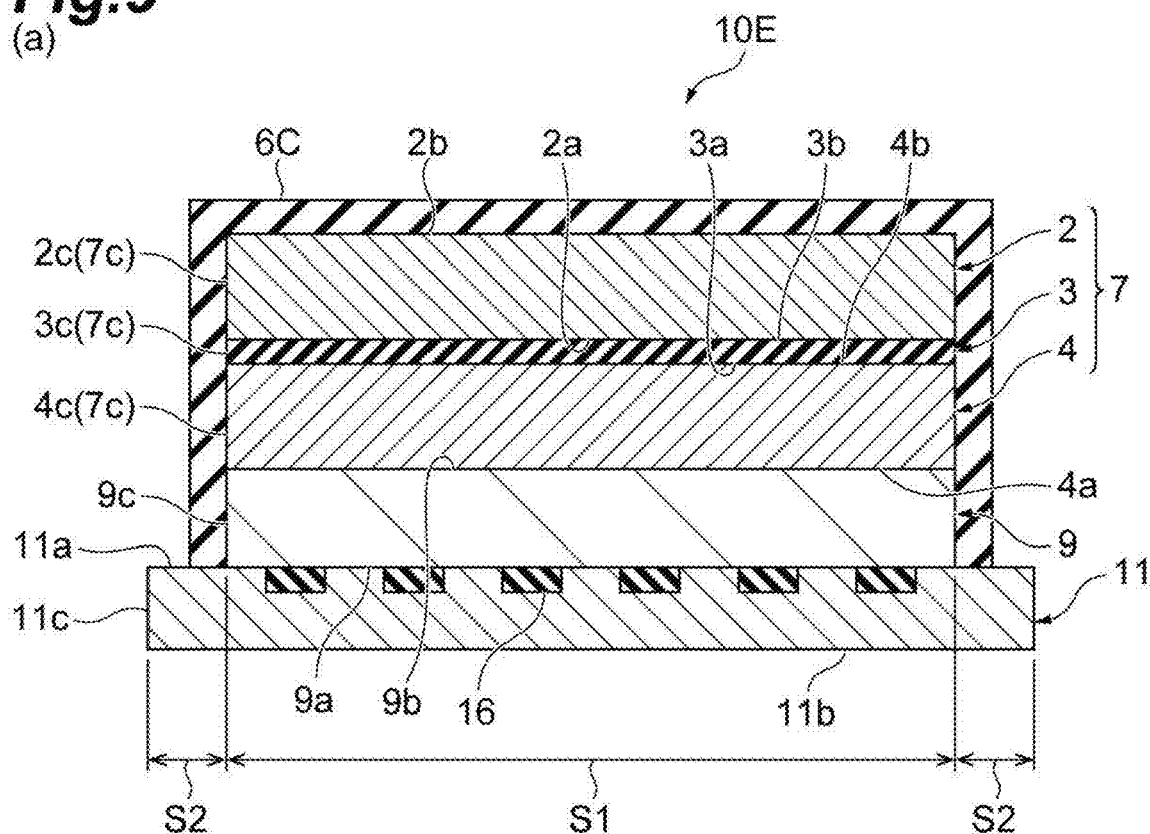
(b)
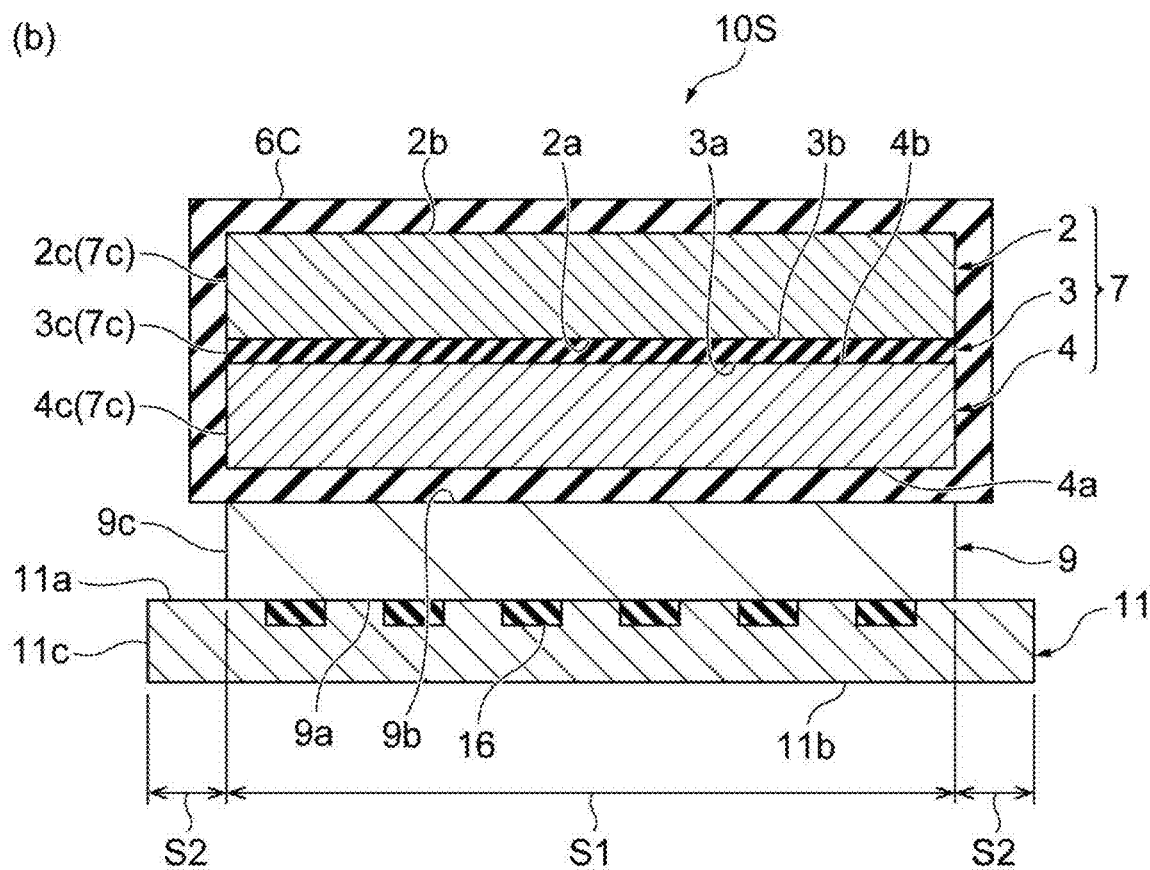

Fig.10
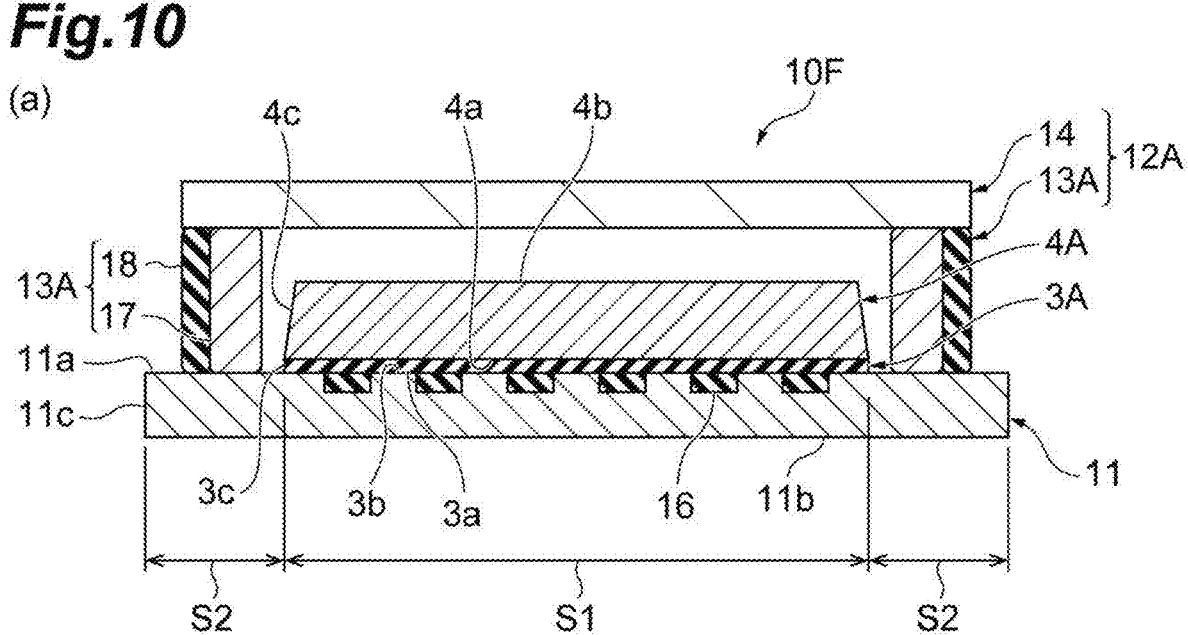
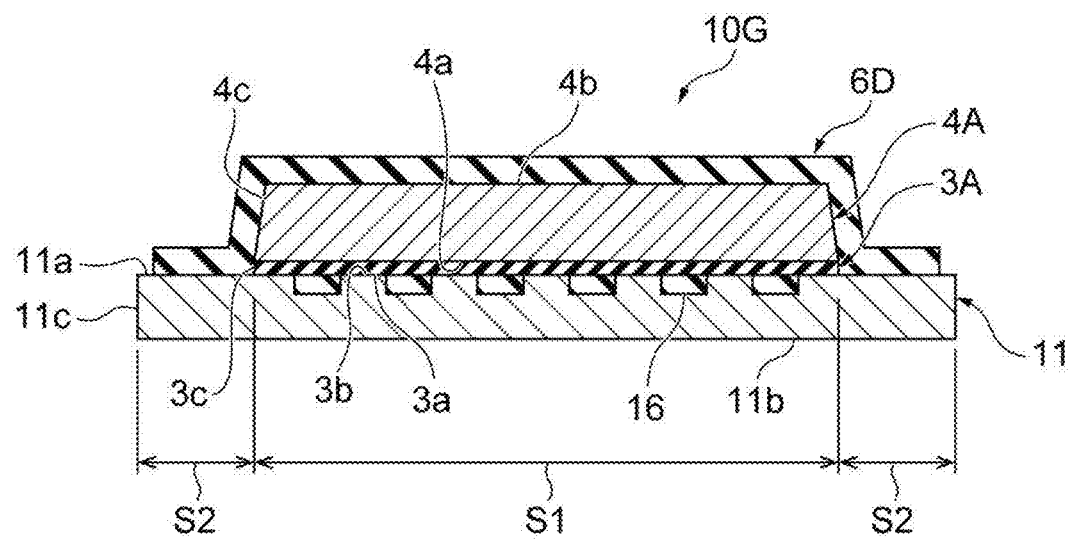
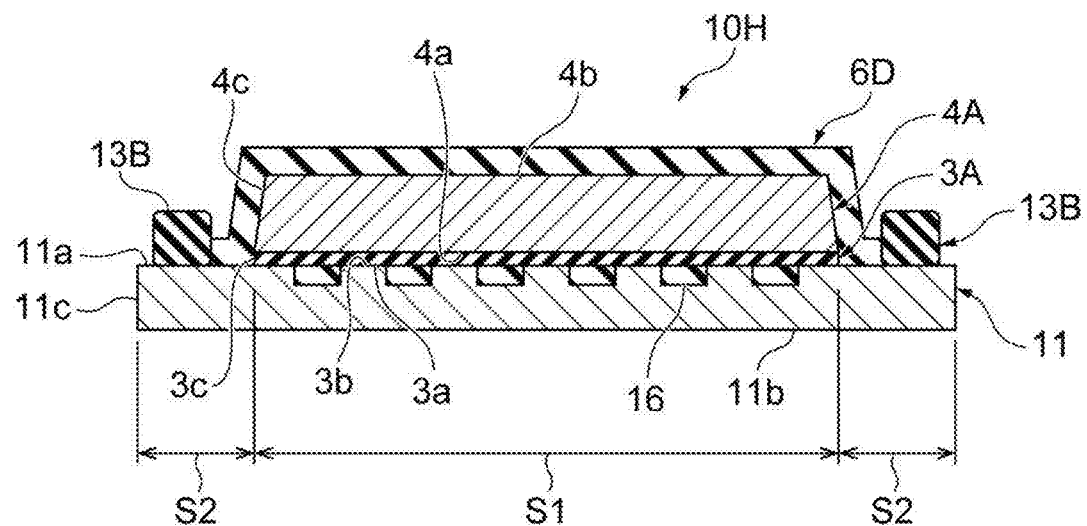

*Fig.11*
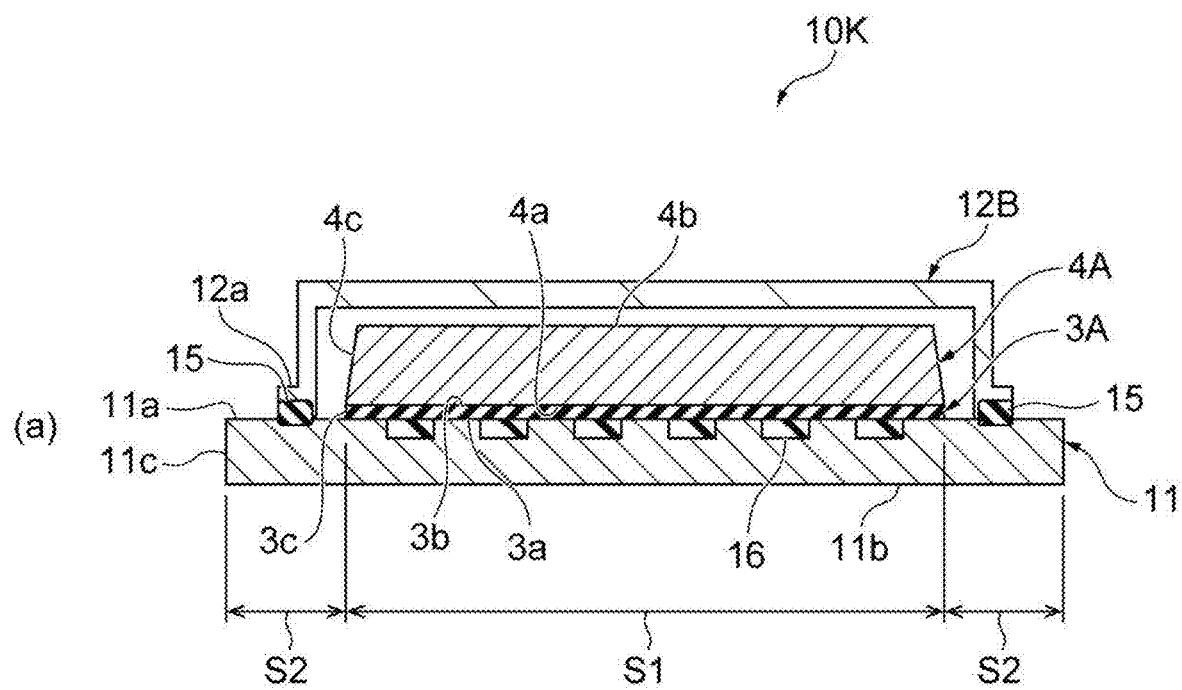
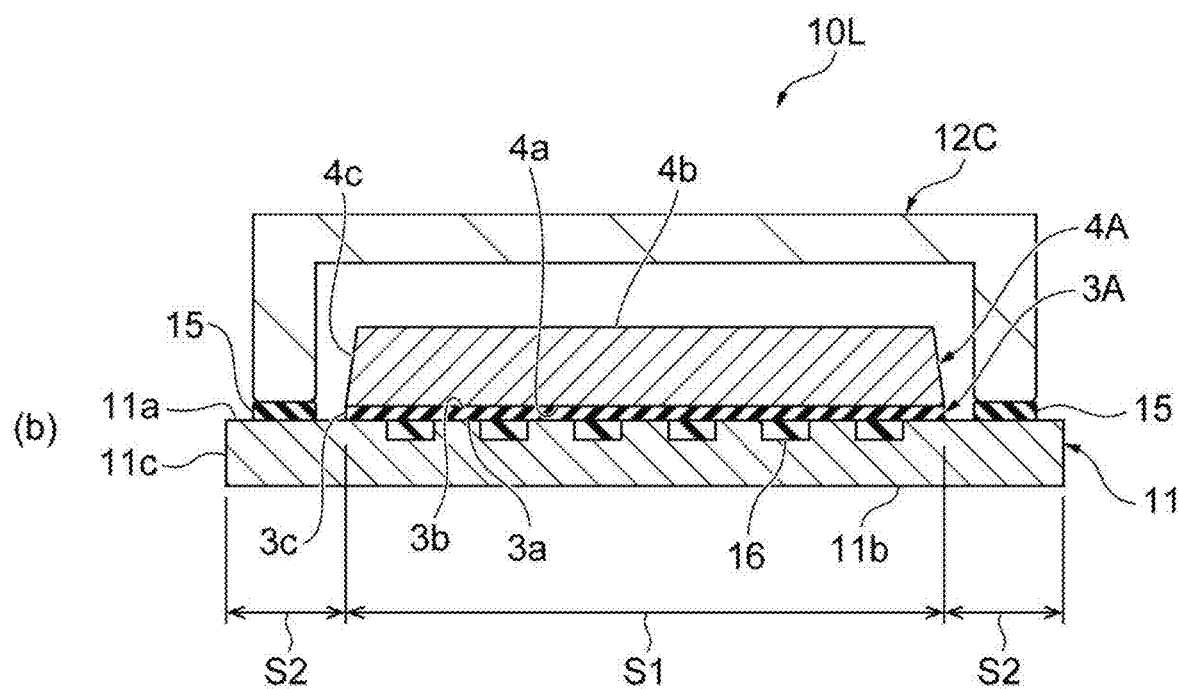

SCINTILLATOR PANEL, AND RADIATION DETECTOR

TECHNICAL FIELD

The present invention relates to a scintillator panel and a radiation detector.

BACKGROUND ART

Patent Literature 1 to Patent Literature 3 are known as technologies in this field.

Patent Literature 1 discloses a scintillator panel. The scintillator panel has a metal film provided between a resin substrate and a fluorescent body layer.

Patent Literature 2 discloses a radiation detection apparatus including a scintillator panel. The scintillator panel has a scintillator layer having cesium iodide as a main component. Thallium is doped into the scintillator layer. The thallium is highly concentrated near an interface of the scintillator layer with respect to a substrate. According to a concentration distribution of the thallium, an optical output is improved.

Patent Literature 3 discloses a radiation detector including a fluorescent body layer. The radiation detector has a scintillator layer having cesium iodide as a main component. Thallium is doped into the scintillator layer. The thallium is highly concentrated on a substrate side in the scintillator layer. According to a concentration distribution of the thallium, adhesion between a sensor substrate and the fluorescent body layer is improved.

CITATION LIST

Patent Literature

Patent Literature 1: PCT International Publication No. WO2011/065302
Patent Literature 2: Japanese Unexamined Patent Publication No. 2008-51793
Patent Literature 3: Japanese Unexamined Patent Publication No. 2012-98110

SUMMARY OF INVENTION

Technical Problem

Growth substrates for growing a scintillator layer sometimes have moisture permeability of allowing moisture to permeate thereinto. Moisture which has permeated into a growth substrate arrives at a base portion of the scintillator layer. It is known that a scintillator layer formed of cesium iodide is deliquescent. Due to moisture supplied through the growth substrate, deliquescence occurs in the base portion of the scintillator layer. As a result, characteristics of a scintillator panel deteriorate. Accordingly, in this field, it is desired that the moisture resistance of a scintillator panel having a scintillator layer formed of cesium iodide be improved.

For example, a scintillator panel of Patent Literature 1 has a metal film provided between a substrate and a fluorescent body layer. The metal film hinders movement of moisture from the resin substrate to the fluorescent body layer.

An object of the present invention is to provide a scintillator panel and a radiation detector, in which the moisture resistance can be improved.

Solution to Problem

According to an aspect of the present invention, there is provided a scintillator panel including a substrate made of an organic material, a barrier layer formed on the substrate and including thallium iodide as a main component, and a scintillator layer formed on the barrier layer and constituted of a plurality of columnar crystals including cesium iodide with thallium added thereto as a main component.

In the scintillator panel, the barrier layer is provided between the substrate and the scintillator layer. The barrier layer includes thallium iodide as a main component. The barrier layer including thallium iodide as a main component has properties of allowing scarcely any moisture to permeate thereinto. As a result, moisture which tends to move from the substrate to the scintillator layer can be blocked by the barrier layer. Since deliquescence in a base portion of the scintillator layer is curbed, deterioration in characteristics of the scintillator panel can be curbed. Accordingly, it is possible improve the moisture resistance of the scintillator panel.

In the scintillator panel, the organic material may be polyethylene terephthalate. According to this constitution, it is possible to easily prepare a substrate suitable for the scintillator panel.

In the scintillator panel, the organic material may be polyethylene naphthalate. According to this constitution as well, it is possible to easily prepare a substrate suitable for the scintillator panel.

According to another aspect of the present invention, there is provided a radiation detector including a scintillator panel having a substrate made of an organic material, a barrier layer formed on the substrate and including thallium iodide as a main component, and a scintillator layer formed on the barrier layer and constituted of a plurality of columnar crystals including cesium iodide with thallium added thereto as a main component; and a sensor substrate including a photo-detection surface provided with a photoelectric conversion element receiving light generated in the scintillator panel. The photo-detection surface of the sensor substrate faces the scintillator layer.

According to still another aspect of the present invention, there is provided a radiation detector including a substrate made of an organic material, a barrier layer fainted on the substrate and including thallium iodide as a main component, and a scintillator layer formed on the barrier layer and constituted of a plurality of columnar crystals including cesium iodide with thallium added thereto as a main component. The substrate has a photo-detection surface provided with a photoelectric conversion element receiving light generated in the scintillator layer.

In the radiation detector, light is generated due to radiation incident on the scintillator panel. Light is detected by the photoelectric conversion element provided on the photo-detection surface. The scintillator panel has the barrier layer including thallium iodide as a main component between the substrate and the scintillator layer. According to the barrier layer, movement of moisture from the substrate to the scintillator layer can be blocked. Accordingly, since deliquescence in the base portion of the scintillator layer is curbed, deterioration in characteristics of the scintillator panel can be curbed. As a result, in the radiation detector, deterioration in characteristics of detecting radiation is curbed. Accordingly, it is possible for the radiation detector to have improved moisture resistance.

Advantageous Effects of Invention

According to the present invention, there are provided a scintillator panel and a radiation detector, in which the moisture resistance can be improved.

A part (a) of FIG. 3 is a cross-sectional view illustrating a scintillator panel according to Modification Example 1, and a part (b) of FIG. 3 is a cross-sectional view illustrating a scintillator panel according to Modification Example 2.

A part (a) of FIG. 4 is a cross-sectional view illustrating a scintillator panel according to Modification Example 3, and a part (b) of FIG. 4 is a cross-sectional view illustrating a scintillator panel according to Modification Example 4.

Figure 5:
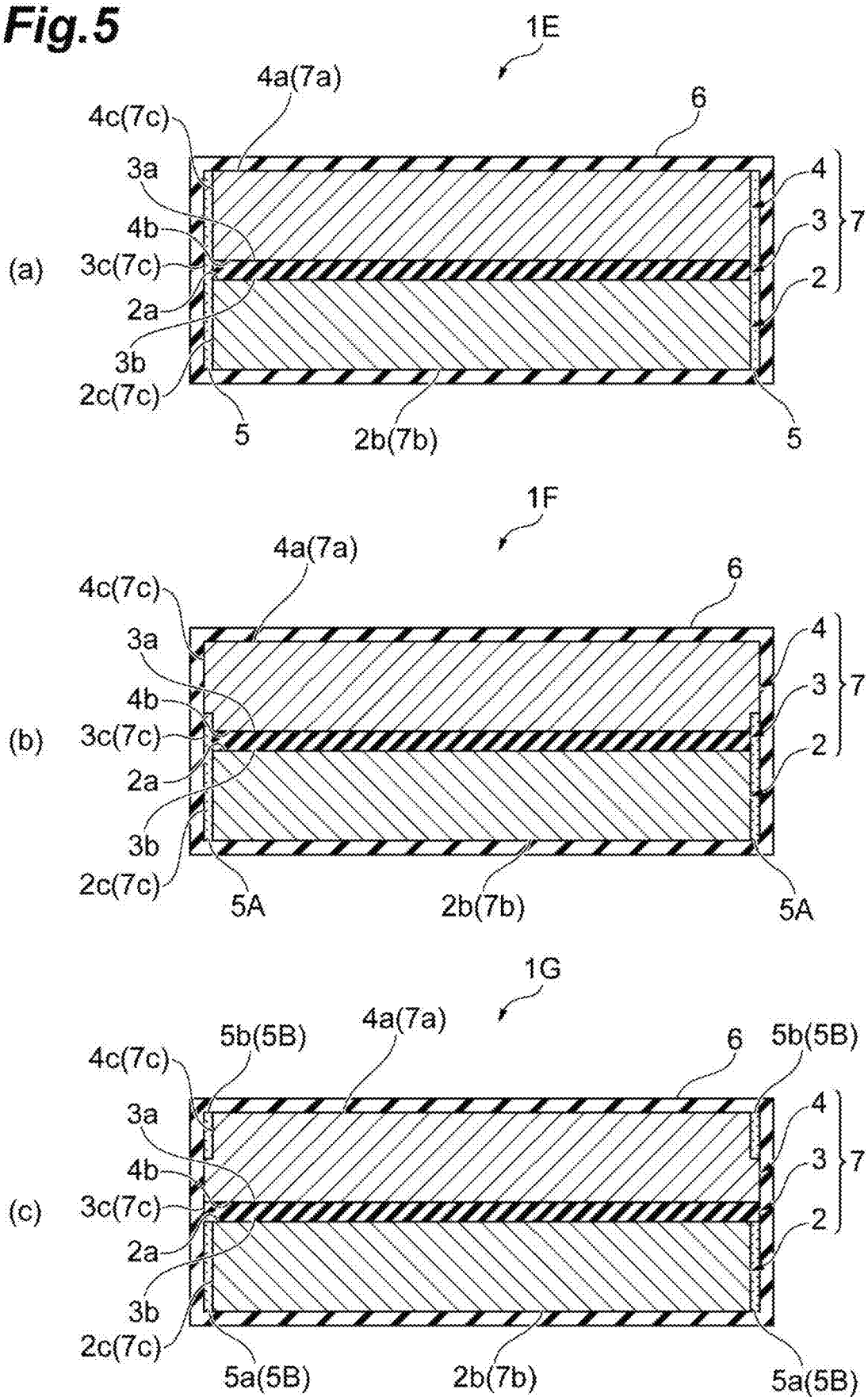

A part (a) of FIG. 5 is a cross-sectional view illustrating a scintillator panel according to Modification Example 5, a part (b) of FIG. 5 is a cross-sectional view illustrating a scintillator panel according to Modification Example 6, and a part (c) of FIG. 5 is a cross-sectional view illustrating a scintillator panel according to Modification Example 7.

A part (a) of FIG. 6 is a cross-sectional view illustrating a scintillator panel according to Modification Example 8, and a part (b) of FIG. 6 is a cross-sectional view illustrating a scintillator panel according to Modification Example 9.

A part (a) of FIG. 7 is a cross-sectional view illustrating a radiation detector according to Modification Example 10, and a part (b) of FIG. 7 is a cross-sectional view illustrating a radiation detector according to Modification Example 11.

A part (a) of FIG. 8 is a cross-sectional view illustrating a radiation detector according to Modification Example 12, and a part (b) of FIG. 8 is a cross-sectional view illustrating a radiation detector according to Modification Example 13.

A part (a) of FIG. 9 is a cross-sectional view illustrating a radiation detector according to Modification Example 14, and a part (b) of FIG. 9 is a cross-sectional view illustrating a radiation detector realized by further deforming that in Modification example 14.

A part (a) of FIG. 10 is a cross-sectional view illustrating a radiation detector according to Modification Example 15, a part (b) of FIG. 10 is a cross-sectional view illustrating a radiation detector according to Modification Example 16, and a part (c) of FIG. 10 is a cross-sectional view illustrating a radiation detector according to Modification Example 17.

A part (a) of FIG. 11 is a cross-sectional view illustrating a radiation detector according to Modification Example 18, and a part (b) of FIG. 11 is a cross-sectional view illustrating a radiation detector according to Modification Example 19.

Figure 12:
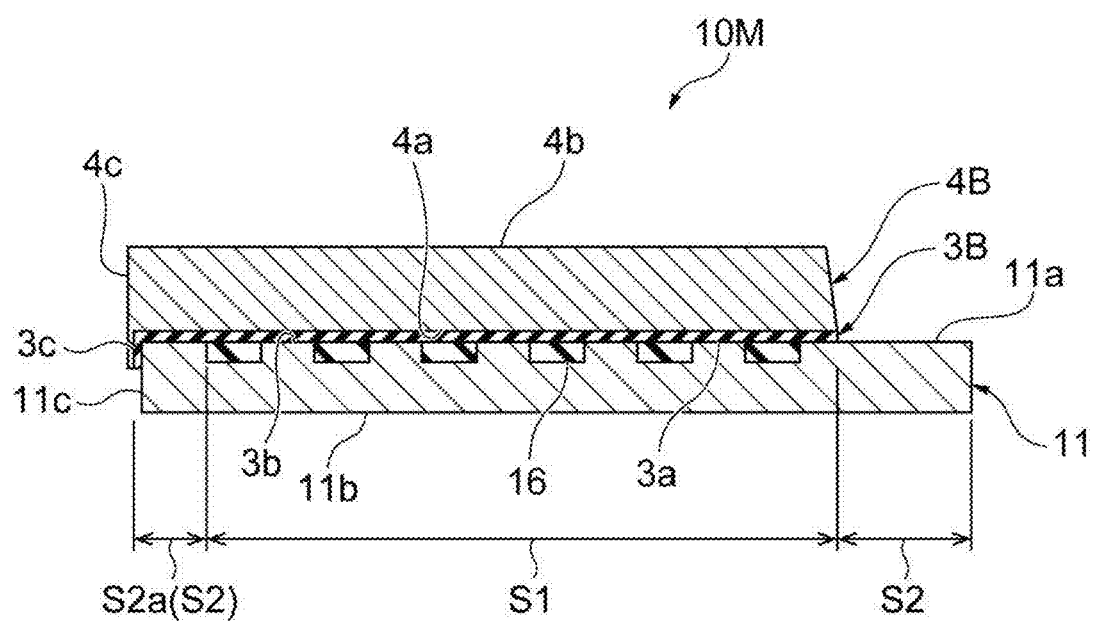

FIG. 12 is a cross-sectional view illustrating a radiation detector according to Modification Example 20.

Figure 13:
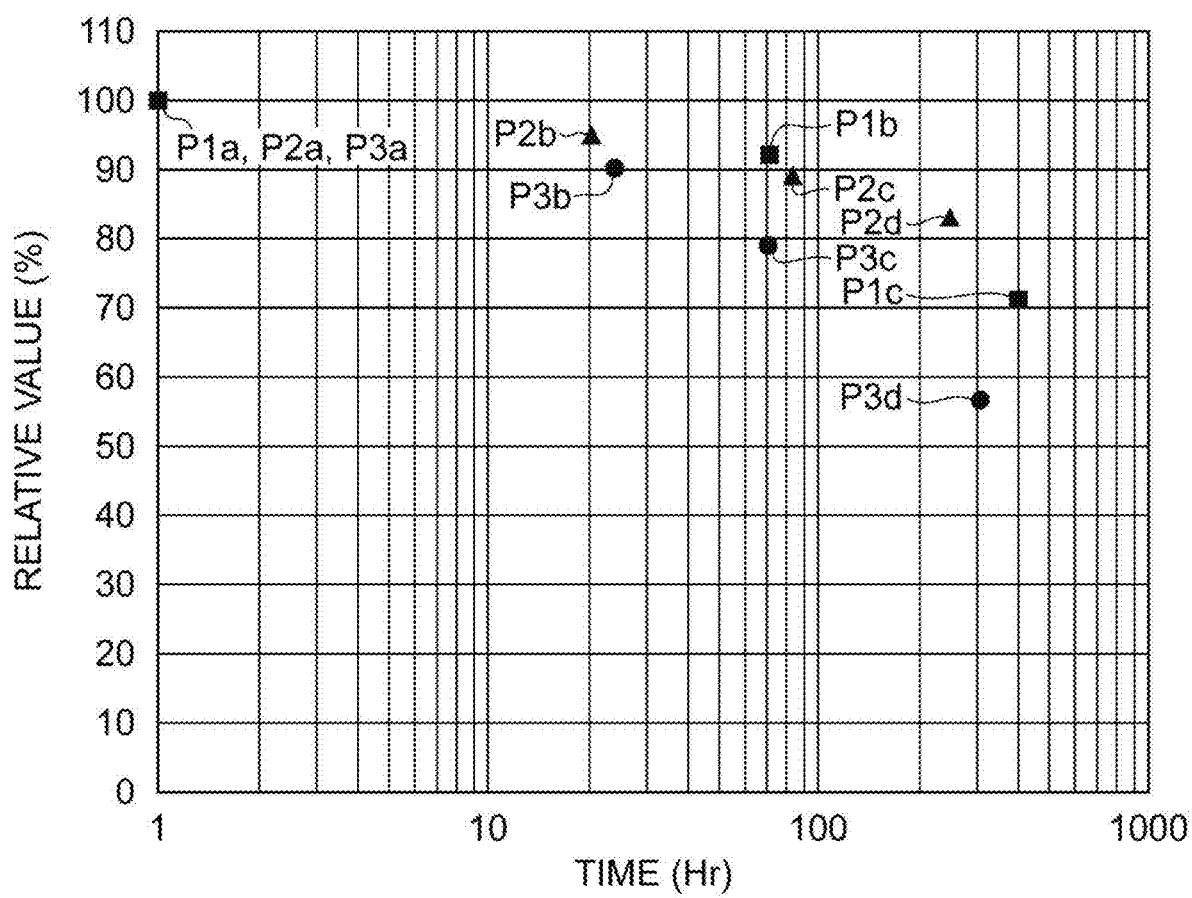

FIG. 13 is a graph showing results of an experimental example.

DESCRIPTION OF EMBODIMENTS

Hereinafter, with reference to the accompanying drawings, embodiments of the present invention will be described in detail. In description of the drawings, the same reference signs will be applied to the same elements, and duplicate description will be omitted.

First Embodiment

Figure 1:
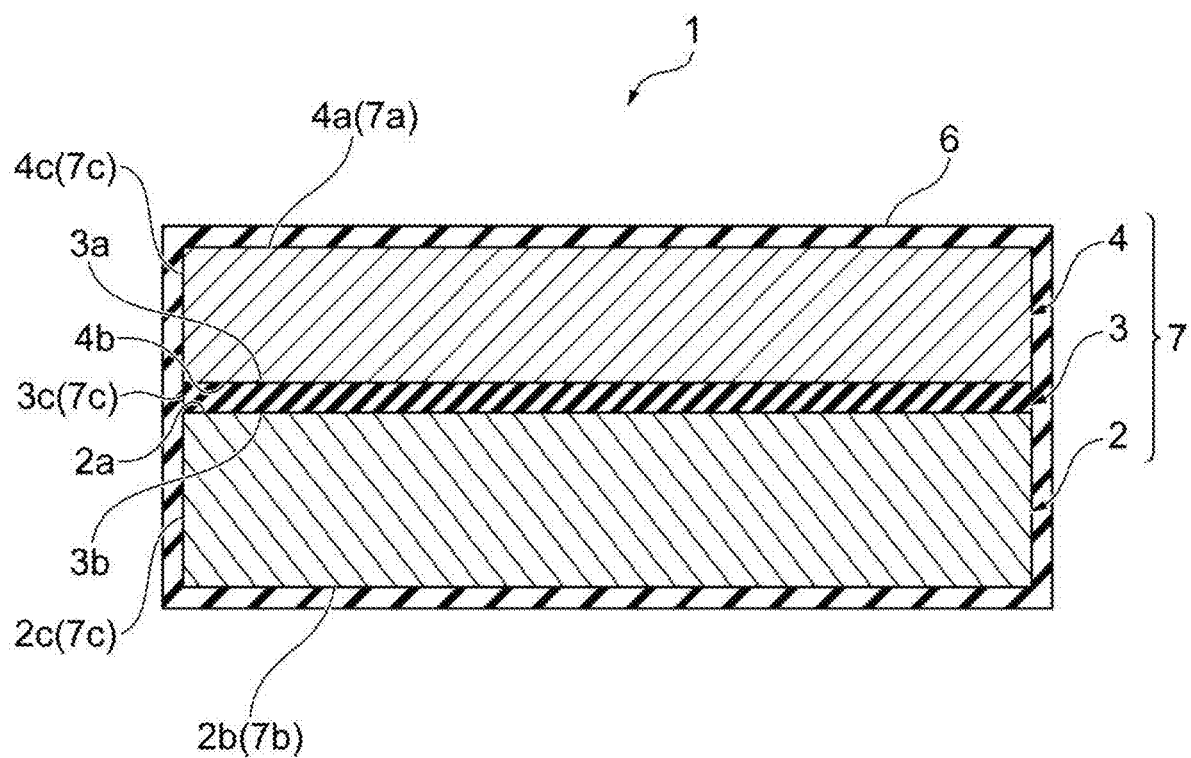
FIG. 1 is a cross-sectional view illustrating a scintillator panel according to a first embodiment.

As illustrated in FIG. 1, a scintillator panel 1 according to a first embodiment has a substrate 2, a barrier layer 3, a scintillator layer 4, and a protective film 6. The scintillator panel 1 is combined with a photoelectric conversion element (not illustrated) and is used as a radiation image sensor.

The substrate 2, the barrier layer 3, and the scintillator layer 4 are laminated in this order in a thickness direction thereof and constitute a laminated body 7. Specifically, the barrier layer 3 is formed on the substrate 2. The scintillator layer 4 is formed on the barrier layer 3. The substrate 2 and the scintillator layer 4 do not directly come into contact with each other. The laminated body 7 has a laminated body front surface 7a, a laminated body rear surface 7b, and a laminated body side surface 7c. The laminated body 7 is covered with the protective film 6. Specifically, each of the laminated body front surface 7a, the laminated body rear surface 7b, and the laminated body side surface 7c is covered with the protective film 6. That is, each of the laminated body front surface 7a, the laminated body rear surface 7b, and the laminated body side surface 7c is not directly exposed to the atmosphere.

The substrate 2 constitutes a base body of the scintillator panel 1. The substrate 2 exhibits a rectangular shape, a polygonal shape, or a circular shape in a plan view. The thickness of the substrate 2 is within a range of 10 micrometers to 5,000 micrometers. As an example, the thickness of the substrate 2 is 100 micrometers. The substrate 2 has a substrate front surface 2a, a substrate rear surface 2b, and a substrate side surface 2c. The substrate rear surface 2b constitutes the laminated body rear surface 7b. The substrate side surface 2c constitutes a portion of the laminated body side surface 7c. The substrate 2 is made of an organic material. Examples of the organic material include polyethylene terephthalate (PET), polyethylene naphthalate (PEN), and polyimide (PI).

The barrier layer 3 hinders movement of moisture from the substrate 2 to the scintillator layer 4. The barrier layer 3 is formed on the substrate front surface 2a. The thickness of the barrier layer 3 is within a range of 0.001 micrometers to 1.0 micrometer. As an example, the thickness of the barrier layer 3 is 0.06 micrometers (600 angstroms). The barrier layer 3 has a barrier layer front surface 3a, a barrier layer rear surface 3b, and a barrier layer side surface 3c. The barrier layer side surface 3c constitutes a portion of the laminated body side surface 7c. The barrier layer 3 includes thallium iodide (TlI) as a main component. For example, the TlI content of the barrier layer 3 may be within a range of 90% to 100%. When the TlI content in the barrier layer 3 is 90% or more, it may be stated that the barrier layer 3 has TlI as a main component. For example, the barrier layer 3 may be Mulled by a two-source vapor deposition method. Specifically, a first vapor deposition source containing cesium iodide (CsI) and a second vapor deposition source containing thallium iodide (TlI) are utilized. The barrier layer 3 is formed by performing vapor deposition of TlI on a substrate prior to CsI. As an example, the thickness of the barrier layer 3 is approximately 600 angstroms. The thickness of the barrier layer 3 can be measured by causing a scintillator layer and a substrate to peel off using a strong adhesive tape or the like and analyzing a substrate interface using an X-ray fluorescence analysis (XRF) apparatus. Examples of X-ray fluorescence analysis apparatuses can include ZSX Primus of RIGAKU Corporation.

The scintillator layer 4 receives radiation and generates light corresponding to the radiation. The scintillator layer 4 includes cesium iodide (fluorescent body material) as a main component. Moreover, the scintillator layer 4 includes thallium as a dopant (CsI:Tl). For example, the CsI content of the scintillator layer 4 may be within a range of 90% to 100%. When the CsI content of the scintillator layer 4 is 90% or more, it may be stated that the scintillator layer 4 has CsI as a main component. The scintillator layer 4 is constituted of a plurality of columnar crystals. Each of the columnar crystals exhibits a light guiding effect. Accordingly, the scintillator layer 4 is suitable for high-resolution imaging. For example, the scintillator layer 4 may be formed by a vapor deposition method. The thickness of the scintillator layer 4 is within a range of 10 micrometers to 3,000 micrometers. As an example, the thickness of the scintillator layer 4 is 600 micrometers. The scintillator layer 4 has a scintillator layer front surface 4a, a scintillator layer rear surface 4b, and a scintillator layer side surface 4c. The scintillator layer front surface 4a constitutes the laminated body front surface 7a. The scintillator layer side surface 4c constitutes a portion of the laminated body side surface 7c described above.

The scintillator layer 4 includes a plurality of columnar crystals extending in the thickness direction of the scintillator layer 4. Base portions of the plurality of columnar crystals constitute the scintillator layer rear surface 4b. The base portions come into contact with the barrier layer front surface 3a of the barrier layer 3. Tip portions of the plurality of columnar crystals constitute the scintillator layer front surface 4a. The columnar crystals formed in an outer circumferential portion of the scintillator layer 4 constitute the scintillator layer side surface 4c. The laminated body side surface 7c includes the substrate side surface 2c, the barrier layer side surface 3c, and the scintillator layer side surface 4c. The substrate side surface 2c, the barrier layer side surface 3c, and the scintillator layer side surface 4c are flush with each other. The expression "flush with each other" denotes that when the substrate side surface 2c, the barrier layer side surface 3c, and the scintillator layer side surface 4c are viewed in a macroscopic manner, each of the surfaces is included in the same virtual plane. There may be cases where the substrate side surface 2c and the scintillator layer side surface 4c have minute uneven structures such as an undercut, a coarse surface, or burrs when viewed in a microscopic manner. However, when they are defined to be "flush with each other", the uneven structures are disregarded.

The protective film 6 covers the laminated body 7. As a result, the protective film 6 protects the laminated body 7 from moisture. The protective film 6 covers the substrate rear surface 2b, the substrate side surface 2c, the barrier layer side surface 3c, and the scintillator layer side surface 4c, and the scintillator layer front surface 4a. The thickness of the protective film 6 may be substantially the same at all places where it is formed. In addition, the thickness of the protective film 6 may vary at every place. In the protective film 6, for example, a film portion formed on the scintillator layer front surface 4a is thicker than film portions formed on the substrate rear surface 2b, the substrate side surface 2c, the barrier layer side surface 3c, and the scintillator layer side surface 4c. The protective film 6 may include polyparaxylylene as a main component. The protective film 6 may be formed by a chemical vapor deposition (CVD) method, for example.

In the scintillator panel 1, the barrier layer 3 is provided between the substrate 2 and the scintillator layer 4. The barrier layer 3 includes thallium iodide as a main component. The barrier layer 3 has properties of allowing scarcely any moisture to permeate thereinto. Accordingly, moisture which tends to move from the substrate 2 to the scintillator layer 4 can be blocked by the barrier layer 3. As a result, deliquescence in the base portion of the scintillator layer 4 is curbed. Accordingly, deterioration in characteristics of the scintillator panel 1 can be curbed.

In the scintillator panel 1, the organic material is polyethylene terephthalate. According to this constitution, the substrate 2 suitable for the scintillator panel 1 can be easily prepared. A substrate suitable for the scintillator panel 1 is a substrate which can be evaluated as being favorable when evaluated based on heat resistance at the time of forming a scintillator layer, handleability at the time of forming a scintillator panel, optical characteristics (reflectivity or absorptivity) with respect to scintillation light, radiation transmission properties, availability, price, and the like.

In the scintillator panel 1, the organic material is polyethylene naphthalate, polyimide, or polyetheretherketone. According to this constitution as well, the substrate 2 suitable for the scintillator panel 1 can be easily prepared.

Second Embodiment

A radiation detector according to a second embodiment will be described. Actually, a region (side) for achieving electrical conduction is provided on a sensor panel 11. However, it is not illustrated in each of the drawings for the sake of convenience.

Figure 2:
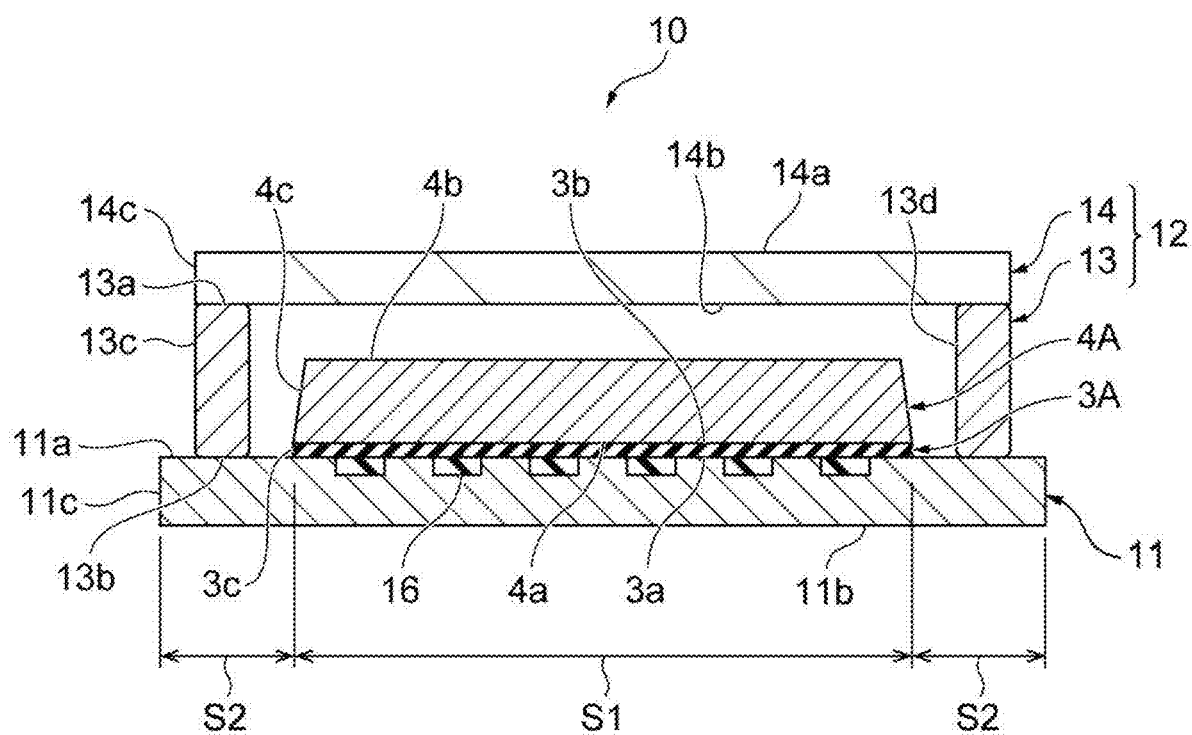
FIG. 2 is a cross-sectional view illustrating a radiation detector according to a second embodiment.

As illustrated in FIG. 2, a radiation detector 10 has the sensor panel 11 (sensor substrate), a barrier layer 3A, a scintillator layer 4A, and a sealing portion 12. Radiation received from a sealing plate 14 is incident on the scintillator layer 4A. The scintillator layer 4A generates light corresponding to the radiation. The light passes through the barrier layer 3A and is incident on the sensor panel 11. The sensor panel 11 generates an electrical signal in response to the incident light. The electrical signal is output through a predetermined electric circuit. According to the electrical signal, a radiation image is obtained.

The sensor panel 11 has a panel front surface 11a, a panel rear surface 11b, and a panel side surface 11c. The sensor panel 11 is a CCD sensor, a CMOS sensor, or a TFT panel having a photoelectric conversion element 16. The sensor panel 11 includes a substrate made of an organic material. A plurality of photoelectric conversion elements 16 are disposed on the panel front surface 11a in a two-dimensional manner. A region on the panel front surface 11a on which a plurality of photoelectric conversion elements 16 are disposed is a photo-detection region S1 (photo-detection surface). In addition to the photo-detection region S1, the panel front surface 11a includes a surrounding region S2 surrounding the photo-detection region S1.

The barrier layer 3A is formed on the panel front surface 11a. The barrier layer 3A has the barrier layer front surface 3a, the barrier layer rear surface 3b, and the barrier layer side surface 3c. More specifically, the barrier layer 3A is formed on the panel front surface 11a such that the photo-detection region S1 is covered. The barrier layer front surface 3a faces the panel front surface 11a. When the barrier layer 3A is viewed in a plan view, the barrier layer 3A is smaller than the sensor panel 11. Accordingly, the barrier layer side surface 3c is not flush with the panel side surface 11c. In the barrier layer 3A, excluding the foregoing constitution, the constitution is otherwise similar to that of the barrier layer 3 in the first embodiment. For example, a material and the like constituting the barrier layer 3A are the same as those of the barrier layer 3 according to the first embodiment.

The scintillator layer 4A is formed on the barrier layer 3A. More specifically, the scintillator layer 4A is formed on the barrier layer rear surface 3b. That is, similar to the barrier layer 3A, the scintillator layer 4A is also formed such that the photo-detection region S1 is covered with the barrier layer 3A therebetween. According to this constitution, light from the scintillator layer 4A can be reliably captured by the photoelectric conversion elements 16. In addition, the scintillator layer side surface 4c is not flush with the panel side surface 11c.

The scintillator layer 4A exhibits a truncated pyramid shape. The scintillator layer side surface 4c is tilted with respect to the thickness direction of the scintillator layer 4A. In other words, the scintillator layer side surface 4c is a slope (inclination). Specifically, when the scintillator layer 4A is viewed in a cross-sectional view in a direction orthogonal to the thickness direction, a cross section exhibits a trapezoidal shape. One side on the scintillator layer front surface 4a side is longer than one side on the scintillator layer rear surface 4b side.

The sealing portion 12 covers a portion of the panel front surface 11a of the sensor panel 11, the barrier layer 3A, and the scintillator layer 4A. The sealing portion 12 is fixed to the surrounding region S2 on the panel front surface 11a. The sealing portion 12 air-tightly maintains an internal space formed by the sealing portion 12 and the sensor panel 11. Due to this constitution, the scintillator layer 4A is protected from moisture.

The sealing portion 12 has a sealing frame 13 and the sealing plate 14. The sealing frame 13 has a frame front surface 13a, a frame rear surface 13b, and a frame wall portion 13c. The frame wall portion 13c joins the frame front surface 13a and the frame rear surface 13b to each other. The height of the frame wall portion 13c (that is, the length from the frame front surface 13a to the frame rear surface 13b) is higher than the height from the panel front surface 11a to the scintillator layer rear surface 4b. A gap is formed between the scintillator layer rear surface 4b and the sealing plate 14. The sealing frame 13 may be constituted of a resin material, a metal material, or a ceramic material, for example. The sealing frame 13 may be solid or hollow. The frame front surface 13a and a plate rear surface 14b, and the frame rear surface 13b and the panel front surface 11a may be joined to each other using an adhesive.

The sealing plate 14 is a plate material having a rectangular shape in a plan view. The sealing plate 14 has a plate front surface 14a, the plate rear surface 14b, and a plate side surface 14c. The plate rear surface 14b is fixed to the frame front surface 13a. The plate side surface 14c may be flush with an outer surface of the frame wall portion 13c. The sealing plate 14 may be constituted of a glass material, a metal material, a carbon material, or a barrier film, for example. Examples of a metal material include aluminum. Examples of a carbon material include carbon fiber reinforced plastic (CFRP). Examples of a barrier film include a laminated body of an organic material layer (PET and/or PEN) and an inorganic material layer (SiN).

In the radiation detector 10, light is generated due to radiation incident on the scintillator layer 4A, and the light is detected by the photoelectric conversion elements 16 provided in the photo-detection region S1. The radiation detector 10 has the barrier layer 3A including thallium iodide as a main component between the sensor panel 11 and the scintillator layer 4A. The barrier layer 3A blocks movement of moisture from the sensor panel 11 to the scintillator layer 4A. Accordingly, deliquescence in the base portion of the scintillator layer 4A is curbed. As a result, deterioration in characteristics of the radiation detector 10 can be curbed.

Hereinabove, embodiments of the present invention have been described. However, the present invention is not limited to the foregoing embodiments and can be performed in various forms. Modification examples 1 to 14 are modification examples of the first embodiment. In addition, Modification examples 15 to 20 are modification examples of the second embodiment.

Modification Example 1

A part (a) of FIG. 3 illustrates a scintillator panel 1A according to Modification Example 1. The scintillator panel 1A may further have another layer, in addition to the substrate 2, the barrier layer 3, and the scintillator layer 4. The scintillator panel 1A has a functional layer 8 as another layer thereof. In the functional layer 8, a functional layer front surface 8a faces the substrate rear surface 2b. The functional layer 8 includes an inorganic material as a main component. The functional layer 8 may be a coating layer formed of a metal foil, a metal sheet, or an inorganic material, for example. A laminated body 7A including the functional layer 8 is covered with the protective film 6. That is, the protective film 6 covers a functional layer rear surface 8b and a functional layer side surface 8c of the functional layer 8, the substrate side surface 2c, the barrier layer side surface 3c, the scintillator layer side surface 4c, and the scintillator layer front surface 4a. According to the scintillator panel 1A, the scintillator layer 4 can be protected from moisture infiltrating into the substrate 2 by the barrier layer 3 and the functional layer 8.

Modification Example 2

A part (b) of FIG. 3 illustrates a scintillator panel 1B according to Modification Example 2. The scintillator panel 1B may have a functional layer 8A having a constitution different from that in Modification example 1. The functional layer 8A is also formed on the substrate side surface 2c, in addition to the substrate rear surface 2b. That is, the functional layer 8A has a first part formed on the substrate rear surface 2b, and a second part formed on the substrate side surface 2c. The first part has the functional layer front surface 8a and the functional layer rear surface 8b. The functional layer front surface 8a faces the substrate rear surface 2b. That is, the entire front surface of the substrate 2 is covered with the barrier layer 3 and the functional layer 8A. The functional layer 8A includes an inorganic material as a main component. The functional layer 8A may be a coating layer formed of an inorganic material, for example. A laminated body 7B including the functional layer 8A is covered with the protective film 6. That is, the protective film 6 covers the first part of the functional layer 8A, the second part of the functional layer 8A, the barrier layer side surface 3c, the scintillator layer side surface 4c, and the scintillator layer front surface 4a. According to the scintillator panel 1B, the scintillator layer 4 can be protected from moisture infiltrating into the substrate 2 by the barrier layer 3 and the functional layer 8A.

Modification Example 3

A part (a) of FIG. 4 illustrates a scintillator panel 1C according to Modification Example 3. The scintillator panel 1C may have a functional layer 8B which differs from that in Modification example 1. The functional layer 8B is formed on the protective film 6. Specifically, the laminated body 7 including the substrate 2, the barrier layer 3, and the scintillator layer 4 is covered with the protective film 6 That is, the protective film 6 covers the substrate rear surface 2b. The functional layer 8B is formed on a part covering the substrate rear surface 2b. Accordingly, the scintillator panel 1C has a laminated structure in which the functional layer 8B, the protective film 6, the substrate 2, the barrier layer 3, and the scintillator layer 4 are laminated in this order in the thickness direction. The functional layer 8B includes an inorganic material as a main component. The functional layer 8B may be a coating layer formed of a metal foil, a metal sheet, or an inorganic material, for example. According to the scintillator panel 1C, the scintillator layer 4 can be protected from moisture infiltrating into the substrate 2 by the barrier layer 3 and the functional layer 8B.

Modification Example 4

A part (b) of FIG. 4 illustrates a scintillator panel 1D according to Modification Example 4. The scintillator panel 1D according to Modification Example 4 may have a functional layer 8C which differs from that in Modification example 1. The functional layer 8C is formed on the protective film 6. The functional layer 8C covers at least a portion of the laminated body 7. Specifically, the laminated body 7 including the substrate 2, the barrier layer 3, and the scintillator layer 4 is covered with the protective film 6. The protective film 6 has a part covering the substrate rear surface 2b and a part covering the substrate side surface 2c. The functional layer 8C is formed on each of a part covering the substrate rear surface 2b and a part covering the substrate side surface 2c. Accordingly, the scintillator panel 1D has a laminated structure in which the functional layer 8C, the protective film 6, the substrate 2, the barrier layer 3, and the scintillator layer 4 are laminated in this order in the thickness direction. The scintillator panel 1D has a laminated structure in which the functional layer 8C, the protective film 6, the substrate 2, the barrier layer 3, and the scintillator layer 4 are laminated in this order in a direction intersecting the thickness direction. The functional layer 8C includes an inorganic material as a main component. The functional layer 8C may be a coating layer formed of a metal foil, a metal sheet, or an inorganic material, for example. According to the scintillator panel 1D, the scintillator layer 4 can be protected from moisture infiltrating into the substrate 2 by the barrier layer 3 and the functional layer 8C.

The scintillator panel 1 according to the first embodiment can be obtained by forming a panel base body having the barrier layer 3 and the scintillator layer 4 formed therein on one large substrate 2 and by cutting the panel base body. Accordingly, machining marks corresponding to a form of cutting are generated in the panel side surface 11c of the scintillator panel 1 sometimes. For example, a laser beam may be utilized in cutting of the panel base body.

Modification Example 5

A part (a) of FIG. 5 illustrates a scintillator panel 1E according to Modification Example 5. The scintillator panel 1E may have a melted region 5 formed on the laminated body side surface 7c. The melted region 5 is a part realized by portions of the substrate 2, the barrier layer 3, and the scintillator layer 4 which have been melted and resolidified due to a laser beam. That is, the melted region 5 is for lied on the entire surface of each of the substrate side surface 2c, the barrier layer side surface 3c, and the scintillator layer side surface 4c. According to the scintillator panel 1E, cutting using a laser beam can be performed.

Such machining marks are formed through steps as described below. First, the laminated body 7 is formed. Next, the laminated body 7 is irradiated with a laser beam from the scintillator layer 4 side. A laser beam performs cutting in the order of the scintillator layer 4, the barrier layer 3, and the substrate 2. Cleavability of the substrate 2 is lower than cleavability of the scintillator layer 4 and the barrier layer 3 made of a plurality of columnar crystals. Accordingly, irradiation of a laser beam continues until the laser beam arrives at the substrate rear surface 2b. In other words, irradiation of a laser beam continues from the scintillator layer front surface 4a to the substrate rear surface 2b. As a result, the melted region 5 is formed over the entire surface of the laminated body side surface 7c which is a cut surface.

Modification Example 6

A part (b) of FIG. 5 illustrates a scintillator panel 1F according to Modification Example 6. The scintillator panel 1F may have a melted region 5A formed in a portion of the laminated body side surface 7c. The melted region 5A is formed on the entire surface of the substrate side surface 2c, on the entire surface of the barrier layer side surface 3c, and in a portion on the scintillator layer side surface 4c. Specifically, the melted region 5A is formed in a part on the scintillator layer side surface 4c connected to the barrier layer side surface 3c.

Such machining marks are formed through steps as described below. First, the laminated body 7 is formed. Next, the laminated body 7 is irradiated with a laser beam from the substrate 2 side. A laser beam performs cutting in the order of the substrate 2, the barrier layer 3, and the scintillator layer 4. The scintillator layer 4 is aggregation of columnar crystals. Accordingly, the scintillator layer 4 has high cleavability. When a groove or a crack is generated in the base portion of the scintillator layer 4, the scintillator layer 4 is cleaved with the crack as a starting point. Accordingly, there is no need to continue irradiation of a laser beam from the substrate rear surface 2b to the scintillator layer front surface 4a. When a laser beam slightly arrives at the scintillator layer side surface 4c from the substrate rear surface 2b, irradiation is stopped. Then, the scintillator layer 4 is cleaved with a groove or a crack formed in the scintillator layer 4 as a starting point. According to this cutting method, irradiation of a laser beam with respect to the scintillator layer 4 can be kept at the minimum. Accordingly, compared to the cutting method in Modification example 5, damage to the scintillator layer 4 can be reduced.

Modification Example 7

A part (c) of FIG. 5 illustrates a scintillator panel 1G according to Modification Example 7. The scintillator panel 1G may have a melted region 5B formed in a portion of the laminated body side surface 7c. The melted region 5B has a melted portion 5a formed on the substrate side surface 2c, and a melted portion 5b formed in a portion on the scintillator layer side surface 4c. Specifically, the melted portion 5b is formed in a part on the scintillator layer side surface 4c on the scintillator layer front surface 4a side. In other words, the melted region 5B is not formed in the base portion of the scintillator layer 4. A melted region connected to the melted portion 5a may be formed on the barrier layer side surface 3c.

Such machining marks are formed through steps as described below. First, the laminated body 7 is formed. Next, the laminated body 7 is irradiated with a laser beam from the substrate 2 side. Then, when a laser beam arrives at the substrate front surface 2a, irradiation is stopped. Through this step, the melted portion 5a on the substrate side surface 2c is formed. Next, irradiation of a laser beam is performed from the scintillator layer 4 side. Then, when the laser beam arrives at a predetermined depth from the scintillator layer front surface 4a, irradiation is stopped. That is, irradiation of a laser beam is not continuously performed from the scintillator layer front surface 4a to the scintillator layer rear surface 4b. In this stage, integrity of the laminated body 7 is maintained by the base portion of the scintillator layer 4 and the barrier layer 3. Next, the scintillator layer 4 is cleaved with a groove and/or a crack provided in the scintillator layer 4 as a starting point. According to this cutting method, irradiation of a laser beam with respect to the scintillator layer 4 can be kept at the minimum. Accordingly, compared to the cutting method in Modification example 5, damage to the scintillator layer 4 can be reduced.

Modification Example 8

A part (a) of FIG. 6 illustrates a scintillator panel 1H according to Modification Example 8. The scintillator panel 1H has a protective sheet 6A, in place of the protective film 6. That is, the scintillator panel 1H has the laminated body 7 and the protective sheet 6A. The protective sheet 6A is constituted by bonding two sheet members 6a and 6b to each other. Specifically, the sheet member 6a is disposed such that it faces the scintillator layer front surface 4a, and the sheet member 6b is disposed such that it faces the substrate rear surface 2b. A gap may be provided between the sheet member 6a and the scintillator layer front surface 4a, and between the sheet member 6b and the substrate rear surface 2b. The sheet member 6a and the scintillator layer front surface 4a may come into contact with each other. The sheet member 6b and the substrate rear surface 2b may come into contact with each other. A surrounding portion of the sheet member 6a overlaps the surrounding portion of the sheet member 6b such that they adhere to each other. According to this constitution, an internal region containing the laminated body 7 can be air-tightly maintained. Accordingly, the scintillator layer 4 can be protected from moisture.

Modification Example 9

A part (b) of FIG. 6 illustrates a scintillator panel 1K according to Modification Example 9. The scintillator panel 1K may have a bag-shaped protective sheet 6B, in place of the protective film 6 That is, the scintillator panel 1K has the laminated body 7 and the protective sheet 6B. The protective sheet 6B has an opening. The protective sheet 6B receives the laminated body 7 through the opening. After the laminated body 7 is received, the opening is closed and is fixed using an adhesive or the like. According to this constitution as well, an internal region containing the laminated body 7 can be air-tightly maintained. Accordingly, the scintillator layer 4 can be protected from moisture.

Modification Example 10

A part (a) of FIG. 7 illustrates a radiation detector 10A according to Modification Example 10. The radiation detector 10A has the laminated body 7 of the scintillator panel 1 according to the first embodiment, the sensor panel 11, and the sealing portion 12. The sensor panel 11 has a constitution substantially similar to that of the sensor panel 11 of the radiation detector 10 according to the second embodiment.

The sealing portion 12 has a constitution substantially similar to that of the sealing portion 12 of the radiation detector 10 according to the second embodiment. In the radiation detector 10A according to Modification Example 10, the height of the frame wall portion 13c of the sealing frame 13 is higher than the height from the panel front surface 11a to the substrate rear surface 2b. The sealing frame 13 may be constituted of a resin material, a metal material, or a ceramic material, for example. When the sealing frame 13 is constituted of a metal material or a ceramic material, an adhesion layer (not illustrated) is formed between the frame front surface 13a and the sealing plate 14. In addition, an adhesion layer (not illustrated) is formed between the frame rear surface 13b and the panel front surface 11a. The sealing plate 14 may be constituted of a glass material, a metal material, a carbon material, or a barrier film, for example. Examples of a metal material include aluminum. Examples of a carbon material include CFRP. Examples of a barrier film include a laminated body of an organic material layer (PET or PEN) and an inorganic material layer (SiN). In the radiation detector 10A, the scintillator layer 4 can be protected from moisture by the sensor panel 11 and the sealing portion 12.

Modification Example 11

A part (b) of FIG. 7 illustrates a radiation detector 10B according to Modification Example 11. The radiation detector 10B has a sealing portion 12A which differs from the radiation detector 10A of Modification example 10. The constitutions of the laminated body 7 and the sensor panel 11 are otherwise similar to those in Modification example 10. The sealing portion 12A has the sealing plate 14 and a sealing frame 13A. The sealing frame 13A further has an inner sealing frame 17 and an outer sealing frame 18. The sealing frame 13 has a dual structure. The inner sealing frame 17 may be constituted of a resin material, for example. The outer sealing frame 18 may be constituted of an inorganic solid material such as a coating layer formed of an inorganic material or a glass rod, for example. In the radiation detector 10B, the scintillator layer 4 can be preferably protected from moisture by the sensor panel 11 and the sealing portion 12A.

Modification Example 12

A part (a) of FIG. 8 illustrates a radiation detector 10C according to Modification Example 12. The radiation detector 10C according to Modification Example 12 has a laminated body 7C having a constitution different from that of the laminated body 7 of the sensor panel 11 according to the first embodiment. The laminated body 7C has a substrate 2A, the barrier layer 3A, and the scintillator layer 4A. The single body constitution of the barrier layer 3A according to Modification Example 12 is similar to that of the barrier layer 3A according to the second embodiment. The single body constitution of the scintillator layer 4A according to Modification Example 12 is similar to that of the scintillator layer 4A according to the second embodiment. Accordingly, the scintillator layer side surface 4c is tilted with respect to the thickness direction.

The laminated body 7C differs from the laminated body 7 according to the first embodiment in that the substrate side surface 2c and the barrier layer side surface 3c are not flush with each other and the substrate side surface 2c and the scintillator layer side surface 4c are not flush with each other. When the laminated body 7C is viewed in the thickness direction in a plan view, the substrate 2A is larger than the barrier layer 3A and the scintillator layer 4A. Accordingly, the substrate front surface 2a has an exposed region S3 exposed from the barrier layer 3A and the scintillator layer 4A.

The laminated body 7C is attached to the sensor panel 11 such that the scintillator layer front surface 4a faces the panel front surface 11a. According to this constitution, the exposed region S3 in the substrate front surface 2a faces the surrounding region S2 of the panel front surface 11a. The substrate front surface 2a is separated from the panel front surface 11a as much as the heights of the scintillator layer 4A and the barrier layer 3A. Here, the sealing frame 13 is sandwiched between the substrate front surface 2a and the panel front surface 11a. The sealing frame 13 and the substrate 2A are fixed to each other through adhesion. Similarly, the sealing frame 13 and the sensor panel 11 are fixed to each other through adhesion. According to this constitution, the substrate 2A can exhibit a function as a growth substrate for the barrier layer 3A and the scintillator layer 4A, and a function as a sealing plate in the radiation detector 10C. Accordingly, the number of components constituting the radiation detector 10C can be reduced.

Modification Example 13

A part (b) of FIG. 8 illustrates a radiation detector 10D according to Modification Example 13. The radiation detector 10D has the sealing frame 13A which differs from the radiation detector 10C of Modification example 12. The constitutions of the laminated body 7C and the sensor panel 11 are similar to those in Modification example 12. The sealing frame 13A has a constitution similar to that of the sealing frame 13A according to Modification Example 11. Accordingly, the sealing frame 13A has the inner sealing frame 17 and the outer sealing frame 18. In the radiation detector 10D, the scintillator layer 4A can be protected from moisture by the substrate 2A, the sensor panel 11, and the sealing frame 13A.

Modification Example 14

A part (a) of FIG. 9 illustrates a radiation detector 10E according to Modification Example 14. The radiation detector 10E has the laminated body 7, a protective film 6C, and the sensor panel 11. The radiation detector 10E further has a fiber optical plate (which will hereinafter be referred to as "an FOP 9"). The FOP 9 is disposed between the laminated body 7 and the sensor panel 11. The laminated body 7 is joined to the sensor panel 11 with the FOP 9 therebetween. Specifically, the FOP 9 is disposed between the scintillator layer 4 and the sensor panel 11. The FOP 9 has an FOP front surface 9a, an FOP rear surface 9b, and an FOP side surface 9c. The FOP rear surface 9b comes into contact with the scintillator layer front surface 4a. The FOP front surface 9a comes into contact with the panel front surface 11a. The FOP side surface 9c is flush with the laminated body side surface 7c. The protective film 6C covers the substrate rear surface 2b, the substrate side surface 2c, the barrier layer side surface 3c, the scintillator layer side surface 4c, and the FOP side surface 9c. Accordingly, the protective film 6C is not formed between the scintillator layer 4 and the FOP 9, and between the FOP 9 and the sensor panel 11. In the radiation detector 10E, the scintillator layer 4 is protected from moisture. In addition, in the radiation detector 10E, the scintillator layer 4 can be preferably optically connected to the sensor panel 11 using the FOP 9. Then, in the radiation detector 10E, there is no protective film 6C between the scintillator layer 4 and the FOP 9, and between the FOP 9 and the sensor panel 11. As a result, in the radiation detector 10E, deterioration in resolution can be curbed.

As a radiation detector 10S illustrated in a part (b) of FIG. 9, the protective film 6C may cover an outer circumferential surface of the laminated body 7. The protective film 6C may be formed between the laminated body 7 and the FOP 9.

Modification Example 15

A part (a) of FIG. 10 illustrates a radiation detector 10F according to Modification Example 15. The radiation detector 10F has the sealing portion 12A which differs from that in the radiation detector 10 according to the second embodiment. The constitutions of the barrier layer 3A, the scintillator layer 4A, and the sensor panel 11 are similar to those in the radiation detector 10 according to the second embodiment. The sealing portion 12A has a constitution similar to that of the sealing portion 12A according to Modification Example 11. The sealing portion 12A has the sealing plate 14 and the sealing frame 13A. The sealing frame 13A further has the inner sealing frame 17 and the outer sealing frame 18. In the radiation detector 10F, the scintillator layer 4A can be preferably protected from moisture.

Modification Example 16

A part (b) of FIG. 10 illustrates a radiation detector 10G according to Modification Example 16. The radiation detector 10G differs from the radiation detector 10 according to the second embodiment in having no sealing portion 12 and having a protective film 6D in place of the sealing portion 12. The constitutions of the barrier layer 3A, the scintillator layer 4A, and the sensor panel 11 are similar to those in the radiation detector 10 according to the second embodiment. The protective film 6D covers the panel front surface 11a, the barrier layer side surface 3c, the scintillator layer side surface 4c, and the scintillator layer rear surface 4b. In the radiation detector 10G, the scintillator layer 4A can be protected from moisture. The protective film 6D is made of a material similar to that of the protective film 6.

Modification Example 17

A part (c) of FIG. 10 illustrates a radiation detector 10H according to Modification Example 17. The radiation detector 10H is realized by adding a sealing frame 13B to the radiation detector 10G according to Modification Example 16. Accordingly, the scintillator layer 4A, the barrier layer 3A, the sensor panel 11, and the protective film 6D are similar to those in the radiation detector 10G according to Modification Example 16. The sealing frame 13B blocks a joining portion between the sensor panel 11 and the protective film 6D. Accordingly, when viewed in the thickness direction in a plan view, the sealing frame 13B is formed along an outer edge of the protective film 6D. The sealing frame 13B may be constituted of a UV curable resin, for example. According to this constitution, invasion of moisture through the joining portion between the sensor panel 11 and the protective film 6D is curbed. Accordingly, the moisture resistance of the radiation detector 10H can be further enhanced.

Modification Example 18

A part (a) of FIG. 11 illustrates a radiation detector 10K according to Modification Example 18. The radiation detector 10K has no sealing portion 12 of the radiation detector 10 according to the second embodiment.

The radiation detector 10K has a sealing sheet 12B, in place of the sealing portion 12. The constitutions of the barrier layer 3A, the scintillator layer 4A, and the sensor panel 11 are similar to those in the radiation detector 10 according to the second embodiment. The sealing sheet 12B exhibits a rectangular shape, a polygonal shape, or a circular shape in a plan view in the thickness direction. The sealing sheet 12B may be constituted of a metal foil, a metal sheet such as an aluminum sheet, or a barrier film, for example. The sealing sheet 12B covers the scintillator layer 4A and the barrier layer 3A. Specifically, it covers the scintillator layer rear surface 4b, the scintillator layer side surface 4c, the barrier layer side surface 3c, and a portion of the panel front surface 11a. In a plan view, the sealing sheet 12B is larger than the scintillator layer 4A and the barrier layer 3A. An outer circumferential edge 12a of the sealing sheet 12B adheres to the panel front surface 11a using an adhesive 15. Accordingly, the sealing sheet 12B and the sensor panel 11 form an air-tight region containing the scintillator layer 4A and the barrier layer 3A. Accordingly, in the radiation detector 10K, the scintillator layer 4A can be protected from moisture. The adhesive 15 may include filler materials. The particle sizes of the filler materials are smaller than the thickness of the adhesion layer. In the radiation detector 10K, the scintillator layer 4A can be preferably protected from moisture.

Modification Example 19

A part (b) of FIG. 11 illustrates a radiation detector 10L according to Modification Example 19. The radiation detector 10L has a sealing frame 12C having a constitution different from that of the sealing sheet 12B according to Modification Example 18. The sealing frame 12C exhibits a box shape. The sealing frame 12C has an opening on a bottom surface. The sealing sheet 12B according to Modification Example 18 has flexibility. On the other hand, the sealing frame 12C according to Modification Example 19 maintains a predetermined shape and is hard. Accordingly, the sealing frame 12C may be constituted of a glass material, a metal material, or a carbon material, for example. The bottom surface of the sealing frame 12C adheres to the panel front surface 11a using the adhesive 15. According to this constitution, the scintillator layer 4A is disposed in an air-tight region formed by the sealing frame 12C and the sensor panel 11. As a result, the scintillator layer 4A can be protected from moisture. In addition, since the sealing frame 12C is hard, the scintillator layer 4A can be protected mechanically.

Modification Example 20

FIG. 12 illustrates a radiation detector 10M according to Modification Example 20. The radiation detector 10M has a barrier layer 3B and a scintillator layer 4B which differ from those in the radiation detector 10 according to the second embodiment. The barrier layer 3B has the barrier layer front surface 3a, the barrier layer rear surface 3b, and the barrier layer side surface 3c. The scintillator layer 4B has the scintillator layer front surface 4a, the scintillator layer rear surface 4b, and the scintillator layer side surface 4c. The single body constitution of the sensor panel 11 is similar to that in the radiation detector 10 according to the second embodiment. The scintillator layer 4B is formed on one side surface of the sensor panel 11 such that it protrudes from the photo-detection region S1. Specifically, first, the barrier layer 3B is formed on the photo-detection region S1, the panel side surface 11c on one side, and a peripheral region S2a between the photo-detection region S1 and the panel side surface 11c on one side. Then, the scintillator layer 4B is formed on the entire surface of the barrier layer 3B such that the barrier layer 3B is covered. The radiation detector 10M having this constitution can be preferably used as a radiation detector for mammography. In such application of the radiation detector 10M, the scintillator layer 4B is disposed such that a side formed to protrude from the photo-detection region S1 is positioned on the breast-wall side of an examinee.

Experimental Example

In the experimental example, effects of improvement in moisture resistance exhibited by the barrier layer, have been confirmed. The moisture resistance stated in the present experimental example denotes a relationship between a time being exposed to an environment having predetermined humidity and a degree of change in resolution (CTF) indicated by the scintillator panel. That is, high moisture resistance denotes that the degree of deterioration in resolution indicated by the scintillator panel is low even when it is exposed to a humidity environment for a long time. On the contrary, low moisture resistance denotes that the degree of deterioration in resolution indicated by the scintillator panel is high when it is exposed to a humidity environment for a long time.

In the experimental example, first, three test bodies (scintillator panels) were prepared. Each of the test bodies had a scintillator layer and a substrate. Each of the scintillator layers included CsI as a main component, and the thickness thereof was 600 micrometers. Then, first and second test bodies had a barrier layer including TlI as a main component between the substrate and the scintillator layer. On the other hand, a third test body had no barrier layer. The third test body was a comparative example in which a scintillator layer was formed directly on a substrate. The substrate of the first test body was an organic substrate including an organic material as a main component. The first test body corresponds to the scintillator panel 1 according to the first embodiment. The substrate of the second test body was a substrate in which a protective film including an organic material as a main component was formed on an aluminum base body. The second test body corresponds to a scintillator panel according to a reference example. The substrate of the third test body was the same as the substrate of the second test body.

The constitutions of the first to third test bodies are as follows.

First test body: a substrate made of an organic material, a barrier layer, and a scintillator layer.

Second test body: a substrate having an organic layer, a barrier layer, and a scintillator layer.

Third test body: a substrate having an organic layer, (no barrier layer), and a scintillator layer.

The resolution of each of the first to third test bodies was obtained. The resolutions were adopted as reference values. Next, the first to third test bodies were installed in an environment testing machine in which the temperature was 40° C. and the humidity was set to 90%. Next, the resolution of each of the test bodies was obtained every predetermined time elapsed from the installation time. Then, the degrees of the ratios of the resolutions obtained with lapse of every predetermined time to the resolutions (reference values)

were calculated. That is, relative values with respect to the resolutions before the test bodies were installed in the environment testing machine were obtained. For example, when the relative value was 100 percent, it indicated that the resolution obtained after the predetermined time elapsed did not change with respect to the resolution before the test bodies were installed in the environment testing machine and the performance did not deteriorate. Accordingly, it indicated that as the relative value becomes smaller, characteristics of the scintillator panel deteriorate.

A graph shown in FIG. 13 shows a relationship between the time being exposed to the foregoing environment (horizontal axis) and the relative value (vertical axis). The resolution of the first test body was measured after an hour, after 72 hours, and after 405 hours from the installation time. Measurement results were indicated as plots P1a, P1b, and P1c. The resolution of the second test body was measured after an hour, after 20.5 hours, after 84 hours, and after 253 hours from the installation time. Measurement results were indicated as plots P2a, P2b, P2c, and P2d. The resolution of the third test body was measured after an hour, after 24 hours, after 71 hours, and after 311 hours from the installation time. Measurement results were indicated as plots P3a, P3b, P3c, and P3d.

The measurement results thereof were confirmed that performance of the third test body (plots P3a, P3b, P3c, and P3d) having no barrier layer deteriorated the most among the first to third test bodies. It was assumed that deterioration in performance occurred in the third test body because moisture percolated from the organic layer to the scintillator layer and deliquescence of the scintillator layer progressed with lapse of time due to the percolated moisture. On the other hand, regarding the first and second test bodies (plots P1a, P1b, and P1c; and plots P2a, P2b, P2c, and P2d) as well, it could be confirmed that the relative values tended to drop with the lapse of time. However, it was obvious that the degrees of drop in relative value indicated by the first and second test bodies were further curbed than the degree of drop in relative value indicated by the third test body. Accordingly, it has been found that deterioration in characteristics of a scintillator panel can be curbed by providing a barrier layer including TlI as a main component. It has been found that a barrier layer including TlI as a main component can contribute to improvement in moisture resistance of a scintillator panel.

REFERENCE SIGNS LIST 1, 1A, 1B, 1C, 1D, 1E, 1F, 1G, 1H, 1K Scintillator panel
2, 2A Substrate
2a Substrate front surface
2b Substrate rear surface
2c Substrate side surface
3, 3A, 3B Barrier layer
3a Barrier layer front surface
3b Barrier layer rear surface
3c Barrier layer side surface
4, 4A, 4B Scintillator layer
4a Scintillator layer front surface
4b Scintillator layer rear surface
4c Scintillator layer side surface
5, 5A, 5B Melted region
5a, 5b Melted portion
6, 6C, 6D Protective film
6A, 6B Protective sheet
6a, 6b Sheet member
7, 7A, 7B Laminated body
7a Laminated body front surface
7b Laminated body rear surface
7c Laminated body side surface
8, 8A, 8B, 8C Functional layer
8a Functional layer front surface
8b Functional layer rear surface
8c Functional layer side surface
9 FOP
9a FOP front surface
9b FOP rear surface
9c FOP side surface
10, 10A, 10B, 10C, 10D, 10E, 10F, 10G, 10H, 10L, 10K, 10M Radiation detector
11 Sensor panel
11a Panel front surface
11b Panel rear surface
11c Panel side surface
12, 12A Sealing portion
12B Sealing sheet
12a Outer circumferential edge
12C Sealing frame
13, 13A, 13B Sealing frame
13a Frame front surface
13b Frame rear surface
13c Frame wall portion
14 Sealing plate
14a Plate front surface
14b Plate rear surface
14c Plate side surface
16 Photoelectric conversion element
17 Inner sealing frame
18 Outer sealing frame
15 Adhesive
S1 Photo-detection region
S2 Surrounding region
S3 Exposed region
S2a Peripheral region

The invention claimed is:

1. A scintillator panel comprising:
a substrate made of an organic material;
a barrier layer formed on the substrate and including thallium iodide as a main component; and
a scintillator layer formed on the barrier layer and constituted of a plurality of columnar crystals including cesium iodide with thallium added thereto as a main component.

2. The scintillator panel according to claim 1, wherein the organic material is polyethylene terephthalate.

3. The scintillator panel according to claim 1 wherein the organic material is one selected from polyethylene naphthalate, polyimide, and polyetheretherketone.

4. A radiation detector comprising:
a scintillator panel having a substrate made of an organic material, a barrier layer formed on the substrate and including thallium iodide as a main component, and a scintillator layer formed on the barrier layer and constituted of a plurality of columnar crystals including cesium iodide with thallium added thereto as a main component; and
a sensor substrate including a photo-detection surface provided with a photoelectric conversion element receiving light generated in the scintillator panel,
wherein the photo-detection surface of the sensor substrate faces the scintillator layer.

5. A radiation detector comprising:
a substrate made of an organic material;
a barrier layer formed on the substrate and including thallium iodide as a main component; and
a scintillator layer formed on the barrier layer and constituted of a plurality of columnar crystals including cesium iodide with thallium added thereto as a main component,
wherein the substrate has a photo-detection surface provided with a photoelectric conversion element receiving light generated in the scintillator layer.

* * * * *